US012639034B2

(12) United States Patent
Lee et al.

(10) Patent No.: US 12,639,034 B2
(45) Date of Patent: May 26, 2026

(54) ELECTRONIC DEVICE AND OPERATION METHOD OF ELECTRONIC DEVICE FOR MINIMIZING POWER CONSUMPTION USING AN ARTIFICIAL INTELLIGENCE SYSTEM

(71) Applicant: SAMSUNG ELECTRONICS CO., LTD., Suwon-si (KR)

(72) Inventors: Dongyul Lee, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 18/422,178

(22) Filed: Jan. 25, 2024

(65) Prior Publication Data

US 2024/0160404 A1     May 16, 2024

Related U.S. Application Data

(63) Continuation of application No. PCT/KR2022/010630, filed on Jul. 20, 2022.

(30) Foreign Application Priority Data

Jul. 30, 2021     (KR) ........................ 10-2021-0100763

(51) Int. Cl.
*G06F 3/16* (2006.01)
*G10L 15/01* (2013.01)
(Continued)

(52) U.S. Cl.
CPC .............. *G06F 3/167* (2013.01); *G10L 15/01* (2013.01); *G10L 15/063* (2013.01); *G10L 15/30* (2013.01)

(58) Field of Classification Search
CPC ...... G06F 3/324; G06F 3/3225; G06F 3/3234; G06F 3/3296; G06F 3/167
See application file for complete search history.

(56) References Cited

U.S. PATENT DOCUMENTS 7,685,446 B2     3/2010   Hong et al.
9,026,822 B2     5/2015   Miwa et al.
(Continued)

FOREIGN PATENT DOCUMENTS

JP     2013-025508     2/2013
JP     WO15-008372     3/2017
(Continued)

OTHER PUBLICATIONS

International Search Report for PCT/KR2022/010630 mailed Nov. 2, 2022, 3 pages.
(Continued)

*Primary Examiner* — Raymond N Phan
(74) *Attorney, Agent, or Firm* — Nixon & Vanderhye P.C.

(57)     ABSTRACT

An electronic device disclosed in the present disclosure may comprise: a user interface comprising interface circuitry; at least one processor comprising processing circuitry operatively connected to the user interface; and a memory operatively connected to at least one processor, wherein the memory stores instructions, at least one processor configured to: infer an expected operation corresponding to an input received using the user interface; derive required performance information for the expected operation; and based on the derived required performance information, configure an operating frequency using an artificial intelligence (AI) dynamic voltage frequency scaling (DVFS) manager.

20 Claims, 13 Drawing Sheets

(51) Int. Cl.
G10L 15/06 (2013.01)
G10L 15/30 (2013.01)

(56) References Cited

U.S. PATENT DOCUMENTS

| | | | |
|---|---|---|---|
| 9,369,040 | B1 | 6/2016 | Dosluoglu et al. |
| 9,411,649 | B2 | 8/2016 | Tseng et al. |
| 9,436,253 | B2 | 9/2016 | Lee et al. |
| 9,619,240 | B2 | 4/2017 | Kruglick |
| 9,760,154 | B2 | 9/2017 | Jun et al. |
| 9,864,426 | B2 | 1/2018 | Dosluoglu et al. |
| 9,891,855 | B2 | 2/2018 | Yang et al. |
| 10,007,291 | B2 | 6/2018 | On |
| 10,747,297 | B2 | 8/2020 | Yoon et al. |
| 11,086,634 | B2 | 8/2021 | Wang et al. |
| 11,216,055 | B2 | 1/2022 | Lee et al. |
| 11,307,864 | B2 | 4/2022 | Chen et al. |
| 11,307,865 | B2 | 4/2022 | Chen et al. |
| 11,307,866 | B2 | 4/2022 | Liu et al. |
| 11,327,555 | B2 | 5/2022 | Yoon et al. |
| 11,656,675 | B2 | 5/2023 | Yoon et al. |
| 2011/0004575 | A1* | 1/2011 | Yang .................. G06F 1/324 |
| | | | 713/320 |
| 2013/0205126 | A1 | 8/2013 | Kruglick |
| 2014/0184619 | A1 | 7/2014 | Kim |
| 2015/0301864 | A1 | 10/2015 | Tseng et al. |
| 2016/0274642 | A1 | 9/2016 | Dosluoglu et al. |
| 2017/0205863 | A1* | 7/2017 | Lee .................. G06F 1/3206 |
| 2018/0275742 | A1 | 9/2018 | Seol et al. |
| 2019/0250691 | A1* | 8/2019 | Lee .................. G06F 1/324 |
| 2020/0110635 | A1 | 4/2020 | Hu et al. |
| 2020/0264683 | A1 | 8/2020 | Jung |
| 2021/0208992 | A1* | 7/2021 | Vega .................. G06F 11/302 |
| 2022/0083116 | A1 | 3/2022 | Lee et al. |

FOREIGN PATENT DOCUMENTS

| | | |
|---|---|---|
| KR | 10-2006-0102659 | 9/2006 |
| KR | 10-2007-0079863 | 8/2007 |
| KR | 10-2010-0046414 | 5/2010 |
| KR | 10-2014-0029721 | 3/2014 |
| KR | 10-2014-0088691 | 7/2014 |
| KR | 10-2015-0067869 A | 6/2015 |
| KR | 1666549 | 10/2016 |
| KR | 10-2017-0081531 | 7/2017 |
| KR | 10-2017-0124017 | 11/2017 |
| KR | 10-2018-0076840 | 7/2018 |
| KR | 10-2018-0107948 | 10/2018 |
| KR | 10-2019-0096477 | 8/2019 |
| KR | 10-2020-0101210 | 8/2020 |
| KR | 10-2021-0064044 | 6/2021 |

OTHER PUBLICATIONS

Written Opinion of the ISA for PCT/KR2022/010630 mailed Nov. 2, 2022, 4 pages.
Korean Office Action dated Jan. 5, 2026 for KR Application No. 10-2021-0100763.

* cited by examiner

Figure 2:
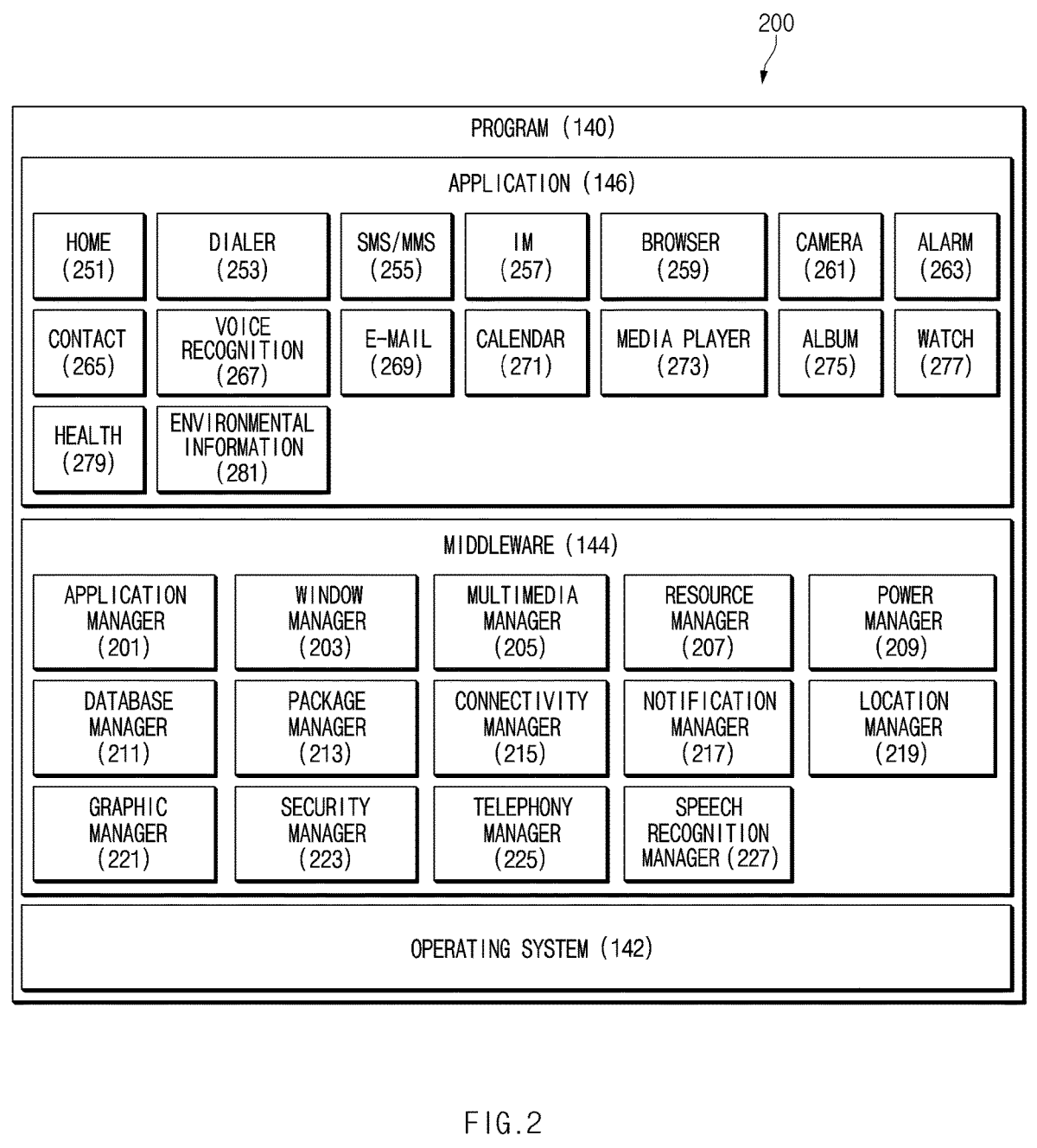

200

PROGRAM (140)

APPLICATION (146)

| HOME (251) | DIALER (253) | SMS/MMS (255) | IM (257) | BROWSER (259) | CAMERA (261) | ALARM (263) |
| CONTACT (265) | VOICE RECOGNITION (267) | E-MAIL (269) | CALENDAR (271) | MEDIA PLAYER (273) | ALBUM (275) | WATCH (277) |
| HEALTH (279) | ENVIRONMENTAL INFORMATION (281) | | | | | |

MIDDLEWARE (144)

| APPLICATION MANAGER (201) | WINDOW MANAGER (203) | MULTIMEDIA MANAGER (205) | RESOURCE MANAGER (207) | POWER MANAGER (209) |
| DATABASE MANAGER (211) | PACKAGE MANAGER (213) | CONNECTIVITY MANAGER (215) | NOTIFICATION MANAGER (217) | LOCATION MANAGER (219) |
| GRAPHIC MANAGER (221) | SECURITY MANAGER (223) | TELEPHONY MANAGER (225) | SPEECH RECOGNITION MANAGER (227) | |

OPERATING SYSTEM (142)

ELECTRONIC DEVICE AND OPERATION METHOD OF ELECTRONIC DEVICE FOR MINIMIZING POWER CONSUMPTION USING AN ARTIFICIAL INTELLIGENCE SYSTEM

CROSS-REFERENCE TO RELATED APPLICATIONS

This application is a continuation of International Application No. PCT/KR2022/010630 designating the United States, filed on Jul. 20, 2022, in the Korean Intellectual Property Receiving Office and claiming priority to Korean Patent Application No. 10-2021-0100763, filed on Jul. 30, 2021, in the Korean Intellectual Property Office, the disclosures of each of which are incorporated by reference herein in their entireties.

BACKGROUND

Field

The disclosure relates to an electronic device and an operating method of the electronic device.

Description of Related Art

With the development of a technology, optimization for both performance and power consumption in smartphones are important factors in determining the quality of a product. The performance and the power consumption are mutually exclusive. For example, when one of the two features gets better, the other gets worse. Alternatively, when one of the two features gets worse, the other gets better.

Moreover, artificial intelligence (AI) may be achieved by modeling actions or patterns of a human through computer operations, and may predict a user's desired actions using a voice of the human or visual information and may execute an application depending on the predicted action.

Nowadays, mobile devices support a function of executing an application, which is requested by a user, using the user's voice information through artificial intelligence technology.

SUMMARY

Embodiments of the disclosure provide a method and apparatus for improving the performance of an electronic device while minimizing and/or reducing power consumption using an artificial intelligence system.

Embodiments of the disclosure provide a method and device for setting an operating frequency using an artificial intelligence system.

According to an example embodiment of the disclosure, an electronic device may include: a user interface, at least one processor comprising processing circuitry operatively connected to the user interface, and a memory operatively connected to at least one processor. At least one processor may be configured to: infer an expected operation corresponding to an input received using the user interface, derive required performance information about the expected operation, and set an operating frequency using an artificial intelligence (AI) dynamic voltage frequency scaling (DVFS) manager based on the required performance information.

According to an example embodiment of the disclosure, a method performed by an electronic device may include:

inferring an expected operation corresponding to an input received using a user interface included in or operatively connected to the electronic device, deriving required performance information about the expected operation, and setting an operating frequency using an artificial intelligence (AI) dynamic voltage frequency scaling (DVFS) manager based on the required performance information.

According to various example embodiments, it is possible to provide a method and apparatus for improving the performance of an electronic device while minimizing and/or reducing power consumption using an artificial intelligence system.

According to various example embodiments, it is possible to provide a method and device for setting an operating frequency using an artificial intelligence system.

Besides, a variety of effects directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a block diagram illustrating an example configuration of a program, according to various embodiments;

With regard to description of drawings, the same or similar components will be marked by the same or similar reference signs.

DETAILED DESCRIPTION

Hereinafter, various example embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
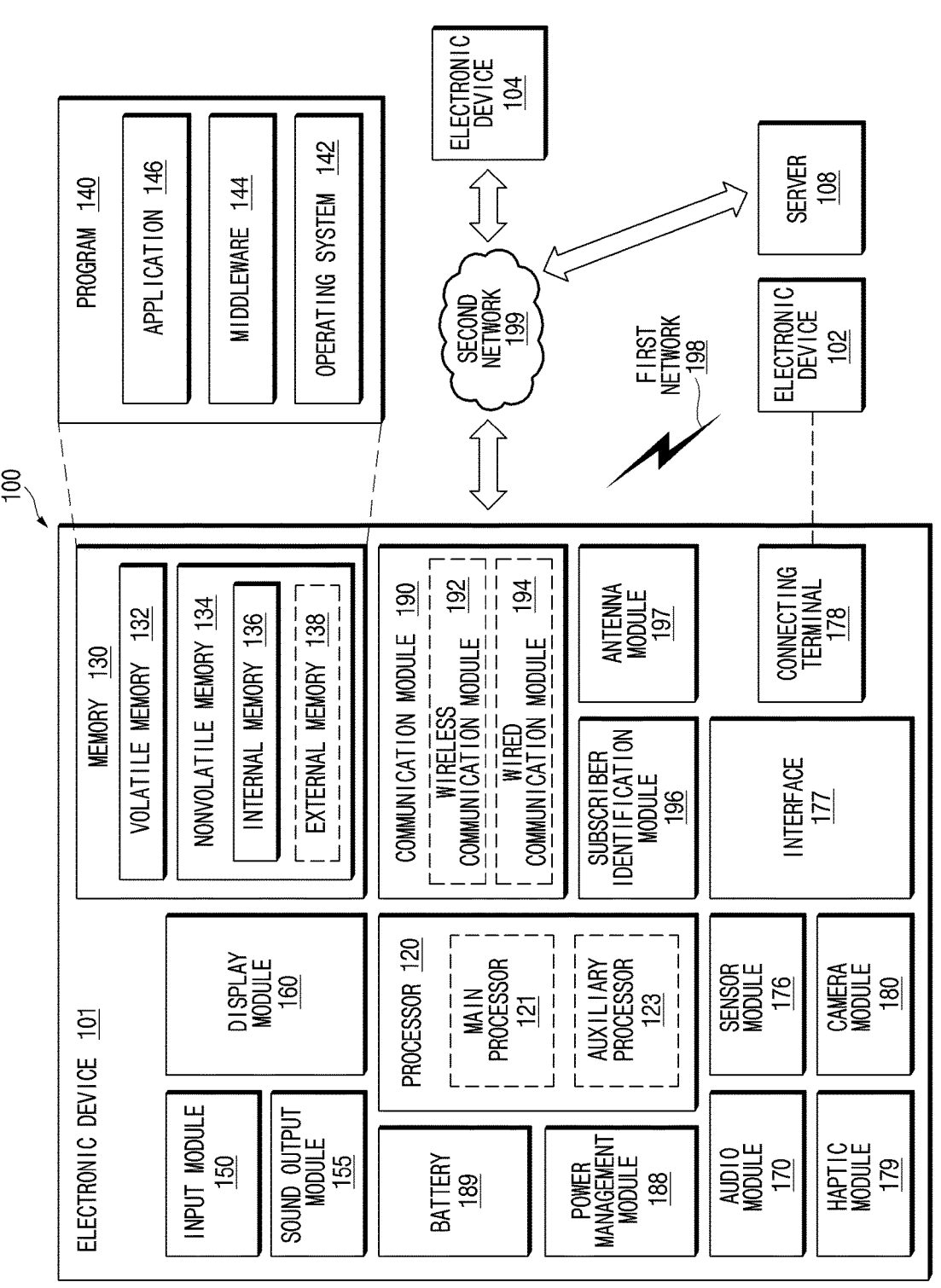
FIG. 1 is a block diagram illustrating an example electronic device in a network environment, according to various embodiments.

FIG. 1 is a block diagram illustrating an example electronic device 101 in a network environment 100, according to various embodiments. Referring to FIG. 1, the electronic device 101 in the environment information 100 may communicate with an electronic device 102 over a first network 198 (e.g., a short range wireless communication network) or may communicate with at least one of an electronic device 104 or a server 108 over a second network 199 (e.g., a long distance wireless communication network). The electronic device 101 may communicate with the electronic device 104 through the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments, the electronic device 101 may not include at least one (e.g., the connecting terminal 178) of the above-described components or may further include one or more other components. In various embodiments, some (e.g., the sensor module 176, the camera module 180, or the antenna module 197) of these components may be integrated into a single component (e.g., the display module 160).

For example, the processor 120 may include various processing circuitry. For example, as used herein, including the claims, the term "processor" may include various processing circuitry, including at least one processor, wherein one or more of at least one processor may be configured to perform various functions described herein. Additionally, the at least one processor may include a combination of processors performing various of the recited/disclosed functions. At least one processor may execute program instructions to achieve or perform various functions. The processor 120 may execute software (e.g., a program 140) to control at least another component (e.g., hardware or software component) of the electronic device 101 connected to the processor 120, and may process and calculate various types of data. According to an embodiment, as at least part of data processing or calculation, the processor 120 may store instructions or data received from other components (e.g., the sensor module 176 or the communication module 190) into a volatile memory 132, may process instructions or data stored in the volatile memory 132, and may store the result data in a nonvolatile memory 134. According to an embodiment, the processor 120 may include a main processor 121 (e.g., a central processing unit or an application processor) and an auxiliary processor 123 (e.g., a graphic processing unit, a neural processing unit (NPU), an image signal processor, a sensor hub processor, or a communication processor) capable of operating independently or together with the main processor. For example, when the electronic device 101 includes the main processor 121 and the auxiliary processor 123, the auxiliary processor 123 may be configured to use less power than the main processor 121 or to be specialized for a specified function. The auxiliary processor 123 may be implemented separately from the main processor 121 or as part of the main processor 121.

For example, the auxiliary processor 123 may control at least part of the functions or states associated with at least one (e.g., the display module 160, the sensor module 176, or the communication module 190) of the components of the electronic device 101, instead of the main processor 121 while the main processor 121 is in an inactive (e.g., sleep) state or together with the main processor 121 while the main processor 121 is in an active (e.g., the execution of an application) state. According to an embodiment, the auxiliary processor 123 (e.g., an image signal processor or a communication processor) may be implemented as a part of operatively associated other components (e.g., the camera module 180 or the communication module 190). According to an embodiment, the auxiliary processor 123 (e.g., a neural network processing unit) may include a hardware structure specialized to process an artificial intelligence model. The artificial intelligence model may be generated through machine learning. For example, the learning may be performed in the electronic device 101, in which an artificial intelligence model is performed, or may be performed through a separate server (e.g., the server 108). For example, the learning algorithm may include supervised learning, unsupervised learning, semi-supervised learning, or reinforcement learning, but may not be limited to the above example. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above-described networks, but may not be limited to the above-described example. In addition to a hardware structure, additionally or alternatively, the artificial intelligence model may include a software structure.

The memory 130 may store various pieces of data used by at least one component (e.g., the processor 120 or the sensor module 176) of the electronic device 101. For example, data may include software (e.g., the program 140) and input data or output data for instructions associated with the software. The memory 130 may include the volatile memory 132 or the nonvolatile memory 134.

The program 140 may be stored in the memory 130 as software, and may include, for example, an operating system 142, middleware 144, or an application 146.

The input module 150 may receive instructions or data to be used for the component (e.g., the processor 120) of electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for a general purpose, such as multimedia play or recording play. The receiver may be used to receive an incoming call. According to an embodiment, the receiver may be implemented separately from the speaker or may be implemented as a part of the speaker.

The display module 160 may visually provide information to the outside (e.g., the user) of the electronic device 101. The display module 160 may include, for example, a display, a hologram device, or a control circuit for controlling a projector and a corresponding device. According to an embodiment, the display module 160 may include a touch sensor configured to sense a touch, or a pressure sensor configured to measure the strength of force generated by the touch.

The audio module 170 may convert sound to an electrical signal, or reversely, may convert an electrical signal to sound. According to an embodiment, the audio module 170 may obtain sound through the input module 150, or may output sound through the sound output module 155, or through an external electronic device (e.g., the electronic device 102) (e.g., a speaker or a headphone) directly or wirelessly connected with the electronic device 101.

The sensor module 176 may sense an operation state (e.g., power or a temperature) of the electronic device 101 or an external environment state (e.g., a user state), and may generate an electrical signal or a data value corresponding the sensed state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more specified protocols that may be used to directly and wirelessly connect the electronic device 101 with an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

The connecting terminal 178 may include a connector that may allow the electronic device 101 to be physically connected with an external electronic device (e.g., the electronic device 102). According to an embodiment, the connecting terminal 178 may include, for example, a HDMI connector, an USB connector, an SD card connector, or an audio connector (e.g., a headphone connector).

The haptic module 179 may convert an electrical signal to a mechanical stimulation (e.g., vibration or movement) or an electrical stimulation which the user may perceive through the sense of touch or the sense of movement. According to an embodiment, the haptic module 179 may include, for example, a motor, a piezoelectric sensor, or an electrical stimulation device.

The camera module 180 may shoot a still image or a video image. According to an embodiment, the camera module 180 may include one or more lenses, image sensors, image signal processors, or flashes (or electrical flashes).

The power management module 188 may manage the power which is supplied to the electronic device 101. According to an embodiment, the power management module 188 may be implemented, for example, as at least part of a power management integrated circuit (PMIC).

The battery 189 may power at least one component of the electronic device 101. According to an embodiment, the battery 189 may include, for example, a primary cell not rechargeable, a secondary cell rechargeable, or a fuel cell.

The communication module 190 may establish a direct (or wired) communication channel or a wireless communication channel between the electronic device 101 and an external electronic device (e.g., the electronic device 102, the electronic device 104, or the server 108) and may perform communication through the established communication channel. The communication module 190 may include one or more communication processors which are operated independently of the processor 120 (e.g., an application processor) and support direct (or wired) communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). The corresponding communication module among these communication modules may communicate with the external electronic device 104 through the first network 198 (e.g., a short-range communication network such as Bluetooth, wireless fidelity (WiFi) direct or infrared data association (IrDA)) or the second network 199 (e.g., a legacy cellular network, 5G networks, next-generation communication networks, Internet, or telecommunication networks such as computer networks (e.g., LAN or WAN)) included in a network. The above-described kinds of communication modules may be integrated in one component (e.g., a single chip) or may be implemented with a plurality of components (e.g., a plurality of chips) which are independent of each other. The wireless communication module 192 may identify or authenticate the electronic device 101 within a communication network, such as the first network 198 or the second network 199, using subscriber information (e.g., international mobile subscriber identity (IMSI)) stored in the subscriber identification module 196.

The wireless communication module 192 may support a 5G network and a next-generation communication technology after a 4G network, for example, a new radio (NR) access technology. The NR access technology may support enhanced mobile broadband (eMBB), massive machine type communications (mMTC), or ultra-reliable and low-latency communications (URLLC). For example, the wireless communication module 192 may support a high frequency band (e.g., mmWave band) to achieve a high data transfer rate. The wireless communication module 192 may support various technologies for securing performance in a high frequency band, for example, technologies such as beamforming, massive multiple-input and multiple-output (massive MIMO), full dimensional MIMO (FD-MIMO), an array antenna, analog beam-forming, and a large scale antenna. The wireless communication module 192 may support various requirements regulated in the electronic device 101, an external electronic device (e.g., the electronic device 104) or a network system (e.g., the second network 199). According to an embodiment, the wireless communication module 192 may support peak data rate (e.g., 20 Gbps or more) for eMBB implementation, loss coverage (e.g., 164 dB or less) for mMTC implementation, or U-plane latency (e.g., downlink (DL) of 0.5 ms or less and uplink (UL) of 0.5 ms or less, or round trip of 1 ms or less) for URLLC implementation.

The antenna module 197 may transmit a signal or a power to the outside (e.g., an external electronic device) or may receive a signal or a power from the outside. According to an embodiment, the antenna module 197 may include an antenna including a radiator formed of a conductor or a conductive pattern formed on a substrate (e.g., PCB). According to an embodiment, the antenna module 197 may include a plurality of antennas (e.g., an array antenna). In this case, at least one antenna suitable for a communication scheme used in a communication network such as the first network 198 or the second network 199 may be selected, for example, by the communication module 190 from the plurality of antennas. The signal or power may be exchanged between the communication module 190 and an external electronic device through the selected at least one antenna or may be received from the external electronic device through the selected at least one antenna and the communication module 190. According to various embodiments, other parts (e.g., radio frequency integrated circuit (RFIC)) may be additionally formed as a part of the antenna module 197 in addition to the radiator.

According to various embodiments, the antenna module 197 may form an mmWave antenna module. According to an embodiment, the mmWave antenna module may include a printed circuit board (PCB), a radio frequency integrated circuit (RFIC), and a plurality of antennas (e.g., an array antenna). The RFIC may be disposed on or adjacent to a first surface (e.g., a bottom surface) of the PCB and may support a specified high frequency band (e.g., mmWave band). The plurality of antennas may be disposed on or adjacent to a second surface (e.g., a top surface or a side surface) of the PCB and may transmit or receive a signal in the specified high frequency band.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 101 and the external electronic device 104 through the server 108 connected to the second network 199. Each of the external electronic device 102 or 104 may be a device of which the type is the same as or different from that of the electronic device 101. According to an embodiment, all or a part of operations to be executed by the electronic device 101 may be executed in one or more external electronic devices among the external electronic devices 102, 104, or 108. For example, when the electronic device 101 needs to perform any function or service automatically or in response to a request from the user or any other device, the electronic device 101 may additionally request one or more external electronic devices to perform at least part of the function or service, instead of internally executing the function or service. The one or more external electronic devices which receive the request may execute at least a part of the function or service thus requested or an additional function or service associated with the request, and may provide a result of the execution to the electronic device 101. The electronic device 101 may process the result as it is or additionally, and may provide a result of the processing as at least a part of the response to the request. To this end, for example, cloud computing, distributed computing, mobile edge computing (MEC), or client-server computing may be used. For example, the electronic device 101 may provide an ultra-low latency service using distributed computing or mobile edge computing. In an embodiment, the external electronic device 104 may include an Internet of Things (IoT) device. The server 108 may be an intelligent server using machine learning and/or a neural network. According to an embodiment, the external electronic device 104 or the server 108 may be included in the second network 199. The electronic device 101 may be applied to an intelligent service (e.g., a smart home, a smart city, a smart car, or a healthcare) based on 5G communication technology and IoT-related technology.

FIG. 2 is a block diagram 200 illustrating an example configuration of a program 140 according to various embodiments. According to an embodiment, the program 140 may include the operating system 142 for controlling one or more resources of the electronic device 101, the middleware 144, or the application 146 executable in the operating system 142. For example, the operating system 142 may include Android™, iOS™, Windows™, Symbian™ Tizen™, or Bada™. For example, at least a part of the program 140 may be preloaded on the electronic device 101 when the electronic device 101 is manufactured. Alternatively, when the electronic device 101 is used by the user, at least a part of the program 140 may be downloaded from an external electronic device (e.g., the electronic device 102 or 104 or the server 108) or may be updated.

The operating system 142 may control the management (e.g., allocating or retrieving) of one or more system resources (e.g., a process, a memory, or a power) of the electronic device 101. Additionally or alternatively, the operating system 142 may include one or more driver programs for driving any other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 is able to be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphics manager 221, a security manager 223, a telephony manager 225, or a speech recognition manager 227.

The application manager 201 may manage, for example, a life cycle of the application 146. The window manager 203 may manage, for example, one or more GUI resources that are used in a screen. The multimedia manager 205 may seize, for example, one or more formats necessary to play media files and may perform encoding or decoding of the corresponding media file among the media files using a codec appropriate for the corresponding format selected from the formats. The resource manager 207 may manage, for example, a source code of the application 146 or a storage space of the memory 130. The power manager 209 may manage, for example, a capacity, a temperature, or a power of the battery 189 and may determine or provide relevant information necessary for an operation of the electronic device 101 using information associated with the capacity, the temperature, or the power. According to an embodiment, the power manager 209 may operate in conjunction with a basic input/output system (BIOS) (not illustrated) of the electronic device 101.

The database manager 211 may generate, search for, or modify, for example, a database to be used by the application 146. The package manager 213 may install or update, for example, an application that is distributed in the form of a package file. The connectivity manager 215 may manage, for example, the wireless connection or direct connection between the electronic device 101 and an external electronic device. The notification manager 217 may provide, for example, a function of notifying the user that a specified event (e.g., an incoming call, a message, or an alarm) occurs. The location manager 219 may manage, for example, location information of the electronic device 101. The graphic manager 221 may manage, for example, one or more graphic effects to be provided to the user or one or more user interfaces associated with the one or more graphic effects.

The security manager 223 may provide, for example, system security or user authentication. The telephony manager 225 may manage, for example, a voice call function or a video call function that is provided by the electronic device 101. The speech recognition manager 227 may transmit, for example, voice data of the user to the server 108, and may receive a command, which corresponds to a function to be performed in the electronic device 101 based at least partially on the voice data, or character data, which are converted based at least partially on the voice data, from the server 108. According to an embodiment, the middleware 244 may remove a part of existing components dynamically or may add new components. According to an embodiment, at least a portion of the middleware 144 may be included as a portion of the operating system 142 or may be implemented with separate software different from the operating system 142.

For example, the application 146 may include a home application 251, a dialer application 253, an SMS/MMS application 255, an instant message (IM) application 257, a browser application 259, a camera application 261, an alarm application 263, a contact application 265, a speech recognition application 267, an e-mail application 269, a calendar application 271, a media player application 273, an album application 275, a watch application 277, a health application 279, or an environment information application 281 (e.g., an atmospheric pressure, humidity, or temperature information measuring application). According to an embodiment, the application 146 may further include an information exchanging application (not illustrated) that is capable of supporting information exchange between the electronic device 101 and an external electronic device. The information exchanging application may include a notification relay application configured to transmit specified information (e.g., a call, a message, or a notification) to the external electronic device or a device management application configured to manage the external electronic device. The notification relay application may transmit, for example, notification information corresponding to a specified event (e.g., an event that a mail is received) occurring in another application (e.g., the e-mail application 269) of the electronic device 101 to the external electronic device. Additionally or alternatively, the notification relay application may receive notification information from the external electronic device and may provide the received notification information to the user of the electronic device 101.

The device management application may control, for example, a power (e.g., turn-on or turn-off) or a function (e.g., a brightness, a resolution, or a focus of the display device 160 or the camera module 180) of the external electronic device communicating with the electronic device 101 or some components (e.g., the display device 160 or the camera module 180) thereof. Additionally or alternatively, the device management application may support the installation, deletion, or update of an application that operates in the external electronic device.

Figure 3:
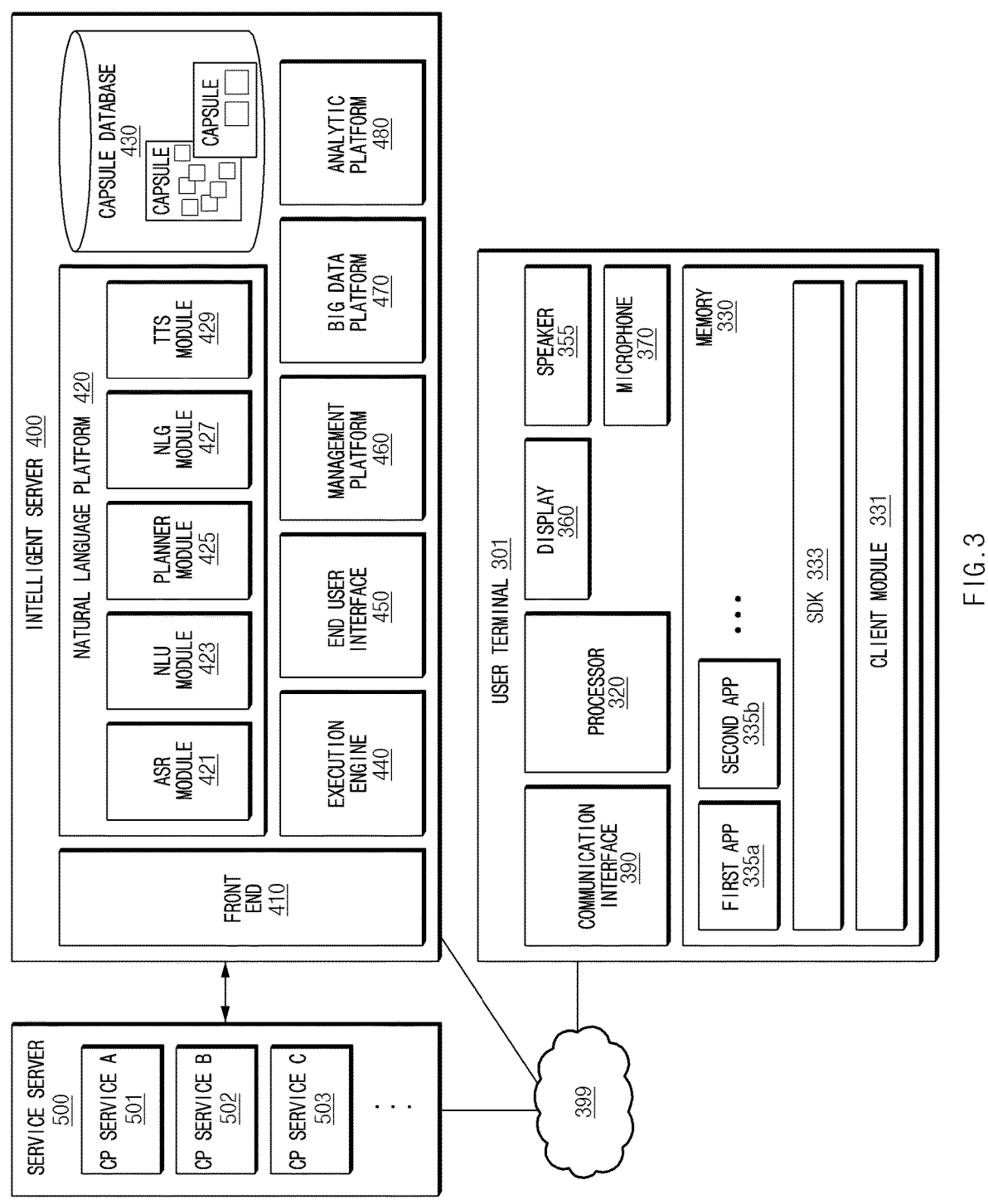
FIG. 3 is a block diagram illustrating an integrated intelligence system, according to various embodiments.

FIG. 3 is a block diagram illustrating an example configuration of an integrated intelligence system, according to various embodiments.

Referring to FIG. 3, an integrated intelligence system according to an embodiment may include a user terminal 301, an intelligent server 400, and a service server 500.

The user terminal 301 according to an embodiment may be a terminal device (or an electronic device) capable of connecting to Internet, and may be, for example, a mobile phone, a smartphone, a personal digital assistant (PDA), a notebook computer, a television (TV), a household appliance, a wearable device, a head mounted display (HMD), or a smart speaker.

According to the illustrated embodiment, the user terminal 301 may include a communication interface 390, a microphone 370, a speaker 355, a display 360, a memory 330, or a processor 320. The listed components may be operatively or electrically connected to one another.

The communication interface 390 according to an embodiment may be connected to an external device and may be configured to transmit or receive data to or from the external device. The microphone 370 according to an embodiment may receive a sound (e.g., a user utterance) to convert the sound into an electrical signal. The speaker 355 according to an embodiment may output the electrical signal as sound (e.g., voice). The display 360 according to an embodiment may be configured to display an image or a video. The display 360 according to an embodiment may display the graphic user interface (GUI) of the running app (or an application program).

The memory 330 according to an embodiment may store a client module 331, a software development kit (SDK) 333, and a plurality of apps 335. The client module 331 and the SDK 333 may include a framework (or a solution program) for performing general-purposed functions. Furthermore, the client module 331 or the SDK 333 may include the framework for processing a voice input.

The plurality of apps 335 may be programs for performing a specified function. According to an embodiment, the plurality of apps 335 may include a first app 335a and/or a second app 335b. According to an embodiment, each of the plurality of apps 335 may include a plurality of actions for performing a specified function. For example, the apps may include an alarm app, a message app, and/or a schedule app. According to an embodiment, the plurality of apps 335 may be executed by the processor 320 to sequentially execute at least part of the plurality of actions.

According to an embodiment, the processor 320 may control overall operations of the user terminal 301. For example, the processor 320 may be electrically connected to the communication interface 390, the microphone 370, the speaker 355, and the display 360 to perform a specified operation. For example, the processor 320 may include at least one processor.

Moreover, the processor 320 according to an embodiment may execute the program stored in the memory 330 so as to perform a specified function. For example, according to an embodiment, the processor 320 may execute at least one of the client module 331 or the SDK 333 so as to perform a following operation for processing a voice input. The processor 320 may control operations of the plurality of apps 335 via the SDK 333. The following actions described as the actions of the client module 331 or the SDK 333 may be the actions performed by the execution of the processor 320.

According to an embodiment, the client module 331 may receive a voice input. For example, the client module 331 may receive a voice signal corresponding to a user utterance detected through the microphone 370. The client module 331 may transmit the received voice input (e.g., a voice signal) to the intelligent server 400. The client module 331 may transmit state information of the user terminal 301 to the intelligent server 400 together with the received voice input. For example, the state information may be execution state information of an app.

According to an embodiment, the client module 331 may receive a result corresponding to the received voice input. For example, when the intelligent server 400 is capable of calculating the result corresponding to the received voice input, the client module 331 may receive the result corresponding to the received voice input. The client module 331 may display the received result on the display 360.

According to an embodiment, the client module 331 may receive a plan corresponding to the received voice input. The client module 331 may display, on the display 360, a result of executing a plurality of actions of an app depending on the plan. For example, the client module 331 may sequentially display the result of executing the plurality of actions on a display. As another example, the user terminal 301 may display only a part of results (e.g., a result of the last action) of executing the plurality of actions, on the display.

According to an embodiment, the client module 331 may receive a request for obtaining information necessary to calculate the result corresponding to a voice input, from the intelligent server 400. According to an embodiment, the client module 331 may transmit the necessary information to the intelligent server 400 in response to the request.

According to an embodiment, the client module 331 may transmit, to the intelligent server 400, information about the result of executing a plurality of actions depending on the plan. The intelligent server 400 may identify that the received voice input is correctly processed, using the result information.

According to an embodiment, the client module 331 may include a speech recognition module. According to an embodiment, the client module 331 may recognize a voice input for performing a limited function, via the speech recognition module. For example, the client module 331 may launch an intelligent app for processing a specific voice input by performing an organic action, in response to a specified voice input (e.g., wake up!).

According to an embodiment, the intelligent server 400 may receive information associated with a user's voice input from the user terminal 301 over a communication network. According to an embodiment, the intelligent server 400 may convert data associated with the received voice input to text data. According to an embodiment, the intelligent server 400 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligent server 400 may transmit a result according to the generated plan to the user terminal 301 or may transmit the generated plan to the user terminal 301. According to an embodiment, the user terminal 301 may display the result according to the plan on a display. According to an embodiment, the user terminal 301 may display a result of executing the action according to the plan on the display.

The intelligent server 400 according to an embodiment may include a front end 410, a natural language platform 420, a capsule database 430, an execution engine 440, an end user interface 450, a management platform 460, a big data platform 470, or an analytic platform 480.

According to an embodiment, the front end 410 may receive a voice input received from the user terminal 301. The front end 410 may transmit a response corresponding to the voice input to the user terminal 301.

According to an embodiment, the natural language platform 420 may include various modules, each of which may include various processing circuitry and/or executable program instructions, including, for example, an automatic speech recognition (ASR) module 421, a natural language understanding (NLU) module 423, a planner module 425, a natural language generator (NLG) module 427, and/or a text to speech module (TTS) module 429.

According to an embodiment, the ASR module 421 may convert the voice input received from the user terminal 301 into text data. According to an embodiment, the NLU module 423 may grasp the intent of the user using the text data of the voice input. For example, the NLU module 423 may grasp the intent of the user by performing syntactic analysis or semantic analysis. According to an embodiment, the NLU module 423 may grasp the meaning of words extracted from the voice input using linguistic features (e.g., syntactic elements) such as morphemes or phrases and may determine the intent of the user by matching the grasped meaning of the words to the intent.

According to an embodiment, the planner module 425 may generate the plan using a parameter and the intent that is determined by the NLU module 423. According to an embodiment, the planner module 425 may determine a plurality of domains necessary to perform a task, based on the determined intent. The planner module 425 may determine a plurality of actions included in each of the plurality of domains determined based on the intent. According to an embodiment, the planner module 425 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 425 may determine the relationship between the plurality of actions and the plurality of concepts stepwise (or hierarchically). For example, the planner module 425 may determine the execution sequence of the plurality of actions, which are determined based on the user's intent, based on the plurality of concepts. In other words, the planner module 425 may determine an execution sequence of the plurality of actions, based on the parameters necessary to perform the plurality of actions and the result output by the execution of the plurality of actions. Accordingly, the planner module 425 may generate a plan including information (e.g., ontology) about the relationship between the plurality of actions and the plurality of concepts. The planner module 425 may generate the plan using information stored in the capsule DB 430 storing a set of relationships between concepts and actions.

According to an embodiment, the NLG module 427 may change specified information into information in a text form. The information changed to the text form may be in the form of a natural language speech. The TTS module 429 according to an embodiment may change information in the text form to information in a voice form.

According to an embodiment, all or part of the functions of the natural language platform 420 may be also implemented in the user terminal 301.

The capsule DB 430 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 430 may store the plurality of capsules in a form of a concept action network (CAN). According to an embodiment, the plurality of capsules may be stored in the function registry included in the capsule DB 430.

The capsule DB 430 may include a strategy registry that stores strategy information necessary to determine a plan corresponding to a voice input. When there are a plurality of plans corresponding to the voice input, the strategy information may include reference information for determining one plan. According to an embodiment, the capsule DB 430 may include a follow-up registry that stores information of the follow-up action for suggesting a follow-up action to the user in a specified context. For example, the follow-up action may include a follow-up utterance. According to an embodiment, the capsule DB 430 may include a layout registry storing layout information of information output via the user terminal 301. According to an embodiment, the capsule DB 430 may include a vocabulary registry storing vocabulary information included in capsule information. According to an embodiment, the capsule DB 430 may include a dialog registry storing information about dialog (or interaction) with the user. The capsule DB 430 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 430 according to an embodiment may be also implemented in the user terminal 301.

According to an embodiment, the execution engine 440 may calculate a result using the generated plan. The end user interface 450 may transmit the calculated result to the user terminal 301. Accordingly, the user terminal 301 may receive the result and may provide the user with the received result. According to an embodiment, the management platform 460 may manage information used by the intelligent server 400. According to an embodiment, the big data platform 470 may collect data of the user. According to an embodiment, the analytic platform 480 may manage quality of service (QoS) of the intelligent server 400. For example, the analytic platform 480 may manage the component and processing speed (or efficiency) of the intelligent server 400.

According to an embodiment, the service server 500 may provide the user terminal 301 with a specified service (e.g., ordering food or booking a hotel). According to an embodiment, the service server 500 may be a server operated by the third party. According to an embodiment, the service server 500 may provide the intelligent server 400 with information for generating a plan corresponding to the received voice input. The provided information may be stored in the capsule DB 430. Furthermore, the service server 500 may provide the intelligent server 400 with result information according to the plan.

In the above-described integrated intelligence system, the user terminal 301 may provide the user with various intelligent services in response to a user input. The user input may include, for example, an input through a physical button, a touch input, or a voice input. The service server 500 may communicate with the intelligent server 400 and/or the user terminal 301 through the network 399. The service server 500 may communicate with the intelligent server 400 through a separate connection. The service server 500 is shown as one server in FIG. 3, the embodiments of this document are not limited thereto. At least one of each service (501, 502, and 503) of the service server (500) may be implemented as a separate server.

According to an embodiment, the user terminal 301 may provide a speech recognition service via an intelligent app (or a speech recognition app) stored therein. In this case, for example, the user terminal 301 may recognize a user utterance or a voice input, which is received via the microphone, and may provide the user with a service corresponding to the recognized voice input.

According to an embodiment, the user terminal 301 may perform a specified action, based on the received voice input, independently, or together with the intelligent server and/or the service server. For example, the user terminal 301 may launch an app corresponding to the received voice input and may perform the specified action via the executed app.

In an embodiment, when providing a service together with the intelligent server 400 and/or the service server, the user terminal 301 may detect a user utterance using the microphone 320 and may generate a signal (or voice data) corresponding to the detected user utterance. The user terminal may transmit the voice data to the intelligent server 400 using the communication interface 310.

According to an embodiment, the intelligent server 400 may generate a plan for performing a task corresponding to the voice input or the result of performing an action depending on the plan, as a response to the voice input received from the user terminal 301. For example, the plan may include a plurality of actions for performing the task corresponding to the voice input of the user and/or a plurality of concepts associated with the plurality of actions. The concept may define a parameter to be entered upon executing the plurality of actions or a result value output by the execution of the plurality of actions. The plan may include relationship information between the plurality of actions and the plurality of concepts.

According to an embodiment, the user terminal 301 may receive the response using the communication interface (e.g., including communication circuitry) 390. The user terminal 301 may output the voice signal generated in the user terminal 301 to the outside using the speaker 355 or may output an image generated in the user terminal 301 to the outside using the display 360.

Figure 4:
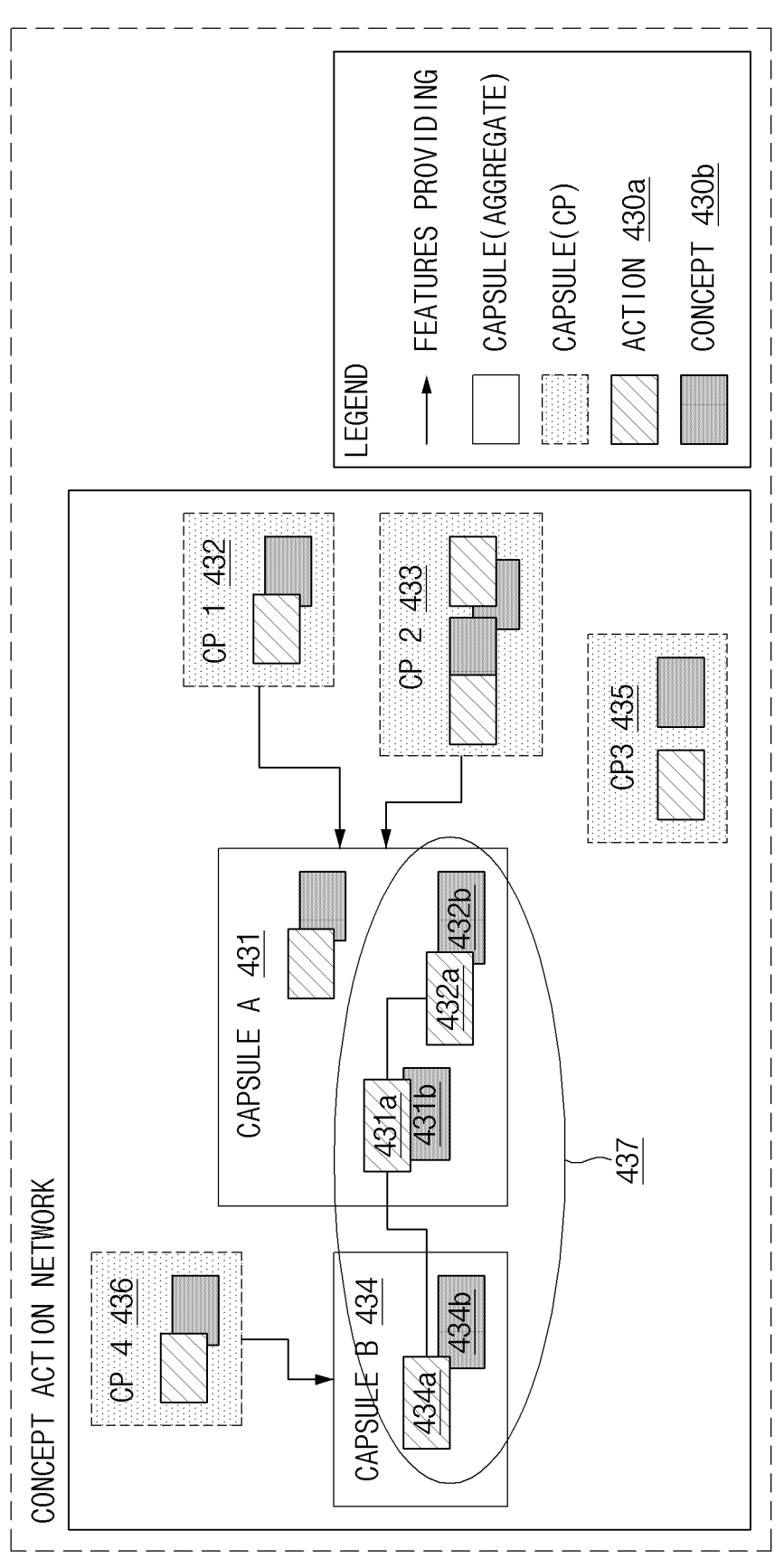
FIG. 4 is a diagram illustrating an example form in which relationship information between a concept and an action is stored in a database, according to various embodiments.

FIG. 4 is a diagram illustrating an example form in which relationship information between a concept and an action is stored in a database, according to various embodiments.

A capsule database (e.g., the capsule DB 430) of the intelligent server 400 may store a capsule in the form of a CAN. The capsule DB may store an action for processing a task corresponding to a user's voice input and a parameter necessary for the action, in the CAN form.

The capsule DB may store a plurality capsules (a capsule A 431 and a capsule B 434) respectively corresponding to a plurality of domains (e.g., applications). According to an embodiment, a single capsule (e.g., the capsule A 431) may correspond to a single domain (e.g., a location (geo) or an application). Furthermore, at least one service provider (e.g., CP 1 432, CP 2 433, CP 3 435, or CP 4 436) for performing a function for a domain associated with the capsule may correspond to one capsule. According to an embodiment, the one capsule may include at least one or more actions 430a and at least one or more concepts 430b for performing a specified function.

The natural language platform 420 may generate a plan for performing a task corresponding to the received voice input using the capsule stored in a capsule database. For example, the planner module 425 of the natural language platform may generate the plan using the capsule stored in the capsule database. For example, a plan 437 may be generated using actions 431a and 432a and concepts 431b and 432b of the capsule A 431 and an action 434a and a concept 434b of the capsule B 434.

Figure 5:
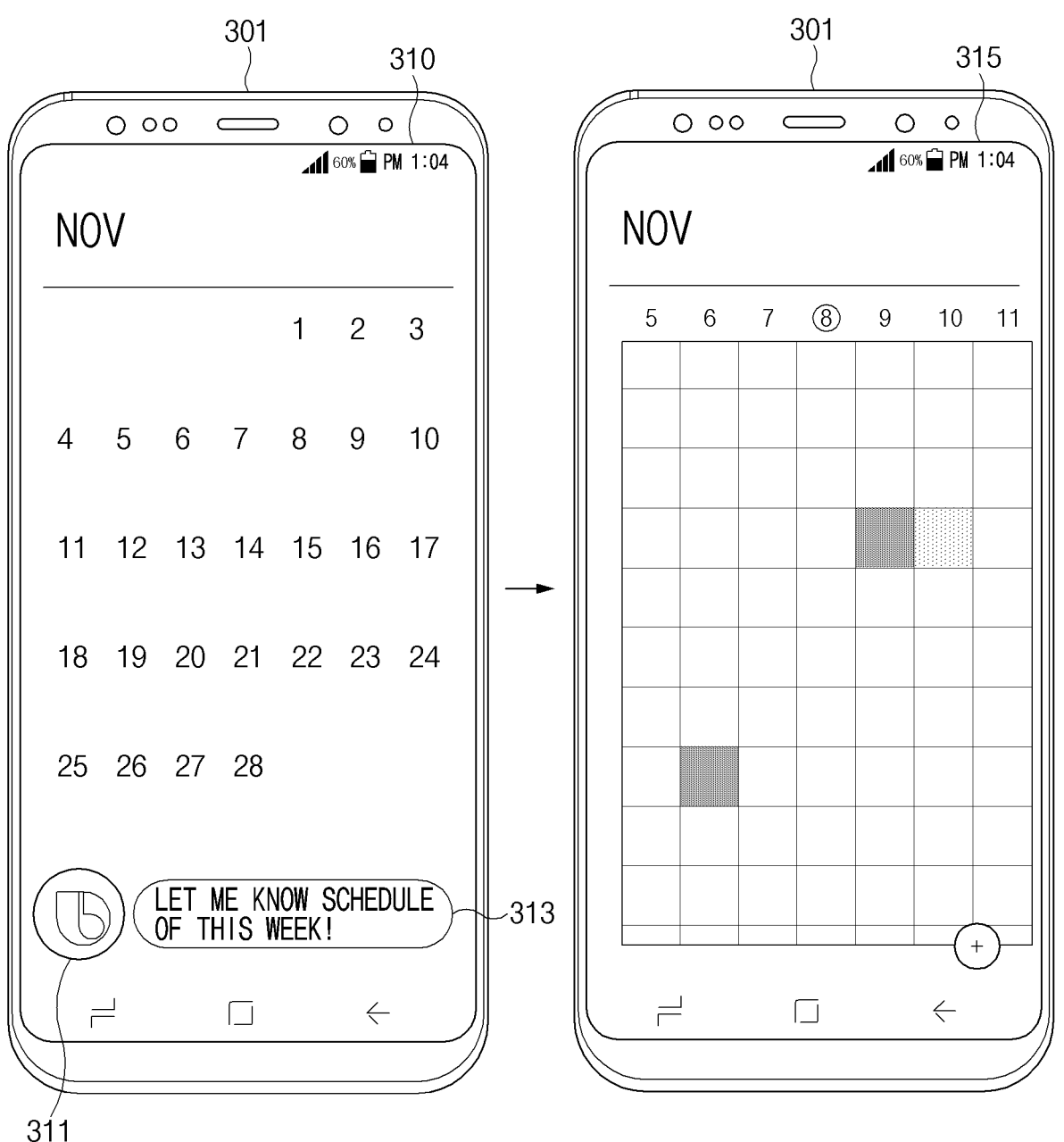
FIG. 5 is a diagram illustrating a user terminal displaying a screen of processing a voice input received through an intelligent app, according to various embodiments.

FIG. 5 is a diagram illustrating an example screen in which a user terminal processes a voice input received through an intelligent app, according to various embodiments.

The user terminal 301 may execute an intelligent app to process a user input through the intelligent server 400.

According to an embodiment, on screen 310, when recognizing a specified voice input (e.g., wake up!) or receiving an input via a hardware key (e.g., a dedicated hardware key), the user terminal 301 may launch an intelligent app for processing a voice input. For example, the user terminal 301 may launch the intelligent app in a state where a schedule app is executed. According to an embodiment, the user terminal 301 may display an object (e.g., an icon) 311 corresponding to the intelligent app, on the display 360. According to an embodiment, the user terminal 301 may receive a voice input by a user utterance. For example, the user terminal 301 may receive a voice input saying that "let me know the schedule of this week!". According to an embodiment, the user terminal 301 may display a user interface (UI) 313 (e.g., an input window) of the intelligent app, in which text data of the received voice input is displayed, on a display.

According to an embodiment, on screen 315, the user terminal 301 may display a result corresponding to the received voice input, on the display. For example, the user terminal 301 may receive a plan corresponding to the received user input and may display "the schedule of this week" on the display depending on the plan.

In an embodiment, the user terminal 301 of FIGS. 3, 4, and 5 may correspond to the electronic device 101 of FIG. 1. In an embodiment, the intelligent server 400 of FIG. 3 may correspond to one of the electronic device 104 and the server 108 of FIG. 1. In an embodiment, the processor 320 of FIG. 3 may correspond to the processor 120 of FIG. 1; the display 360 of FIG. 3 may correspond to the display module 160 of FIG. 1; and, the speaker 355 of FIG. 3 may correspond to the sound output module 155 of FIG. 1.

Figure 6:
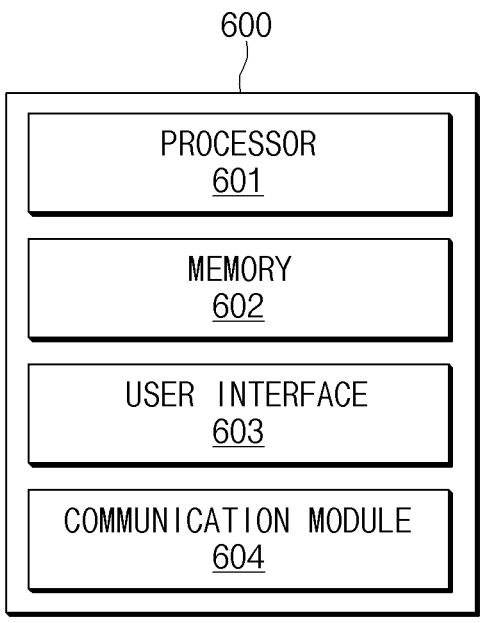
FIG. 6 is a block diagram illustrating an example configuration of an electronic device, according to various embodiments.

FIG. 6 is a block diagram illustrating an example configuration of an electronic device 600, according to various embodiments. For clarity of description, descriptions the same as the above-mentioned descriptions may be briefly described or may not be repeated here.

Referring to FIG. 6, the electronic device 600 may include a processor (e.g., including processing circuitry) 601 (e.g., the processor 320 of FIG. 3 and/or the processor 120 of FIG.

1), a memory 602 (e.g., the memory 130 of FIG. 1), a user interface (e.g., including interface circuitry) 603, and a communication module (e.g., including communication circuitry) 604 (e.g., the communication module 190 of FIG. 1). The user interface 603 may include a microphone (not illustrated) (e.g., the microphone 370 of FIG. 3 and/or the input module 150 of FIG. 1) and a speaker (not illustrated) (e.g., the speaker 355 of FIG. 3 and/or the sound output module 155 of FIG. 1).

The electronic device 600 may further include at least one of additional components in addition to the components illustrated in FIG. 6. According to an embodiment, the components of the electronic device 600 may be the same entities or may include separate entities.

For example, the electronic device 600 may include, without limitation, a smartphone, a tablet PC, a wearable device, a home appliance, a digital camera, or the like. According to an embodiment, the processor 601 may include various processing circuitry. For example, as used herein, including the claims, the term "processor" may include various processing circuitry, including at least one processor, wherein one or more of at least one processor may be configured to perform various functions described herein. Additionally, the at least one processor may include a combination of processors performing various of the recited/disclosed functions. At least one processor may execute program instructions to achieve or perform various functions. The processor 601 may be operatively coupled to the communication module 604, the memory 602, and the user interface 603 (e.g., a microphone (not illustrated) and a speaker (not illustrated)) to perform overall functions of the electronic device 600. For example, the processor 601 may include one or more processors. For example, the one or more processors may include an image signal processor (ISP), an application processor (AP), or a communication processor (CP).

Furthermore, the processor 601 may drive modules by executing the instructions stored in the memory 602.

To perform overall functions of the electronic device 600, the processor 601 may be operatively connected to modules. In an, it may be understood that an operation performed (or executed) by the modules is an operation performed by the processor 601 executing instructions stored in the memory 602.

In an embodiment, the processor 601 may include a module. In this case, an operation performed (or executed) by each of the modules may be implemented as at least part of the processor 601.

Several modules described in various embodiments of the disclosure may be implemented by hardware, software, or a combination of hardware and software.

The memory 602 may store a database (not illustrated) (e.g., a database 740 of FIG. 7) including at least one input data. The memory 602 may store commands, information, or data associated with operations of components included in the electronic device 600. For example, the memory 602 may store instructions, when executed, that cause the processor 601 to perform various operations described in the disclosure.

In an embodiment, the electronic device 600 may receive an input, e.g., a user input, using the user interface 603. The user input may be an input including a user voice signal (e.g., a user's utterance input).

In an embodiment, the user input may be the user's voice input (e.g., an utterance). When the user input is a voice input, the electronic device 600 may receive a user input through a microphone (or a voice receiving device) (not illustrated).

In an embodiment, the user input may be a gesture input and/or a touch input. When the user input is a gesture input and/or a touch input, the electronic device 600 may receive a user input through a sensor (not illustrated).

According to an embodiment, the processor 601 may include a sound module (not illustrated). The sound module may recognize a user input for executing an operation. For example, the sound module may recognize and receive the voice signal. For example, the sound module recognizing the user input may have a high speech recognition rate because ambient noise is strong.

According to an embodiment, the sound module may be trained to recognize and receive the user input using an algorithm for recognizing a voice. For example, the algorithm for recognizing the voice may be at least one of a hidden Markov model (HMM) algorithm, an artificial neural network (ANN) algorithm, and a dynamic time warping (DTW) algorithm.

According to an embodiment, the sound module may perform tasks of data refinement, data integration, data reduction, and/or data conversion. The data refinement may include an operation of filling in incomplete data and correcting inconsistent data. The data integration may include an operation of merging various divided databases and files for easy analysis. The data reduction may include an operation of sampling only some of input data or reducing the dimension of data to be analyzed. The data conversion may include an operation of normalizing or grouping data by obtaining an average value of the data. The sound module may process data, thereby preventing and/or reducing meaningless values from being included in data or preventing and/or reducing data quality from being degraded due to unintended variables. Accuracy and timeliness may be increased through the sound module.

In an embodiment, at least one of operations of each component described with reference to the electronic device 600 may be performed (or executed) by an external server (not illustrated) or another electronic device (not illustrated). For example, the processor 601 may transmit a user input to the external server (not illustrated) or the other electronic device (not illustrated) using the communication module 604.

A processor (not illustrated) included in an external server (not illustrated) or the other electronic device (not illustrated) may receive the user input, may generate response data, and may transmit the response data to the electronic device 600.

The processor 601 may receive the response data corresponding to the user input from the external server (not illustrated) or the other electronic device (not illustrated) through the communication module 604. When receiving the response data, the processor 601 may allow the response data to be output through the user interface 603. Alternatively, through the communication module 604, other devices may be controlled or data may be stored. The processor 601 may include at least one or more processors, and may be driven while being physically divided into a main processor performing high-performance processing and an auxiliary processor performing low-power processing. Alternatively, one processor may process data by switching between a high performance mode and a low power mode depending on situations.

Hereinafter, an operation of the processor 601 will be described in greater detail below, keeping in mind that the processor 601 may include various processing circuitry, including at least one processor, wherein one or more of at least one processor may be configured to perform various functions described herein. Additionally, the at least one processor may include a combination of processors performing various of the recited/disclosed functions. At least one processor may execute program instructions to achieve or perform various functions.

According to an example embodiment, an electronic device may include: a user interface a, at least one processor, and a memory. The memory 602 may store instructions. the at least one processor may be configured to infer an expected operation corresponding to an input received using the user interface, to derive required performance information about the expected operation, and to set an operating frequency using an AI dynamic voltage frequency scaling (DVFS) manager based on the required performance information.

According to an example embodiment, the electronic device may further include an audio module including audio circuitry operatively connected to or included at least one processor. At least one processor may be configured to cause the audio module to receive a voice signal included in the user input. The audio module may be trained using a learning algorithm.

According to an example embodiment, at least one processor may be configured to infer the expected operation using an AI system defining an application to operate on the electronic device and operates a trained model, in response to the user input.

According to an example embodiment, at least one processor may be configured to derive the required performance information including at least one of hardware module information for performing the expected operation, operating frequency information, governor policy information, and time information indicating that a governor policy according to the governor policy information needs to be maintained.

According to an example embodiment, at least one processor may be configured to set a DVFS governor to the governor policy according to the governor policy information using the AI DVFS manager depending on the time information indicating that the governor policy included in the required performance information needs to be maintained, during only a time required to maintain the governor policy included in the required performance information, and to set a DVFS governor to a governor policy, which is prior to the governor policy according to the governor policy information, in response to the time required to maintain the governor policy elapsing.

According to an example embodiment, at least one processor may be configured to set the operating frequency according to the governor policy information using the AI DVFS manager based on the required performance information including governor policy information and excluding operating frequency information.

According to an example embodiment, at least one processor may be configured to determine whether hardware module included in the hardware module information is capable of operating at a first operating frequency according to the operating frequency information, using the AI DVFS manager based on the required performance information including operating frequency information and hardware module information and excluding governor policy information, to change a governor policy such that the AI DVFS manager sets the operating frequency based on the hardware module being capable of operating at the first operating frequency, and to set the operating frequency to a value, equal to or higher than the first operating frequency, according to the changed governor policy.

According to an example embodiment, at least one processor may be configured to set the operating frequency to a maximum operating frequency of the hardware module or a minimum operating frequency of the hardware module based on the hardware module being incapable of operating at the first operating frequency.

According to an example embodiment, at least one processor may be configured to determine whether hardware module included in the hardware module information is capable of operating at a second operating frequency according to the operating frequency information, using the AI DVFS manager based on the required performance information including hardware module information, governor policy information, and operating frequency information, to change a governor policy such that the AI DVFS manager sets the operating frequency based on the hardware module being capable of operating at the second operating frequency, and to set the operating frequency to a value, which is equal to or higher than the second operating frequency, according to the changed governor policy.

According to an example embodiment, at least one processor may be configured to set the operating frequency according to governor policy information included in the required performance information based on a hardware module included in the required performance information being incapable of operating at an operating frequency included in the required performance information.

Figure 7:
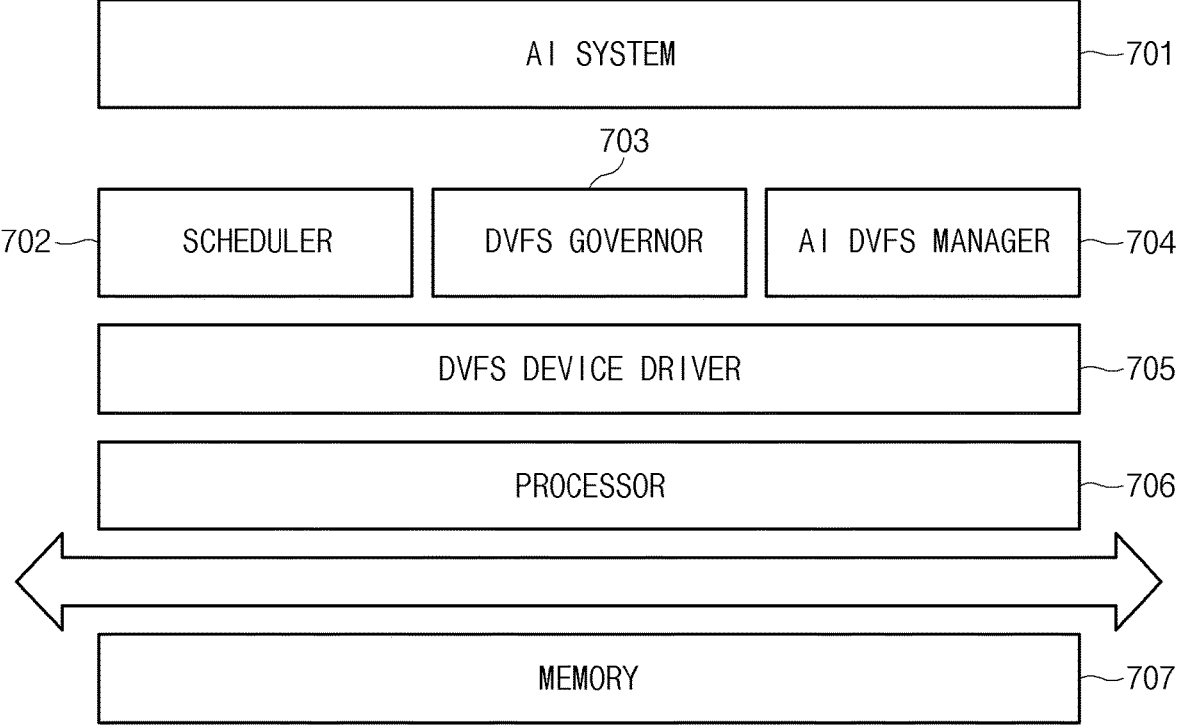
FIG. 7 is a block diagram illustrating an example configuration of an electronic device, according to various embodiments.

FIG. 7 is a block diagram illustrating an example configuration of an electronic device, according to various embodiments. For clarity of description, descriptions the same as the above-mentioned descriptions may be briefly described or may not be repeated here.

According to the illustrated embodiment, an electronic device may include an AI system 701, a scheduler 702, a dynamic voltage frequency scaling (DVFS) (hereinafter referred to as "DVFS") governor 703, an AI DVFS manager 704, a DVFS device driver 705, a processor (e.g., including processing circuitry) 706, and/or a memory 707. The listed components may be operatively or electrically connected to one another.

In FIG. 7, the AI system 701, the scheduler 702, the DVFS governor 703, the AI DVFS manager 704, the DVFS device driver 705, at least one processor 706, and/or the memory 707 are shown separately, but are not limited thereto, and may each include various processing circuitry and/or executable program instructions.

The AI system 701 may refer to a system that defines an application to operate on an electronic device in response to a user input received by using an interface, which is included in or operatively connected to the electronic device, and operates the trained model. For example, the AI system 701 may be a voice assistant system.

In an embodiment, when the user input is received, the AI system 701 may infer an application capable of performing the user input and then may operate the inferred application. The AI system 701 may train whether the workload of the application to be performed on the electronic device is heavy or light.

In an embodiment, the AI system 701 may predefine and add the performance of a hardware module required for the workload. The AI system 701 may deliver information about hardware module performance required for the workload to the AI DVFS manager 704.

The AI DVFS manager 704 may dynamically set an operating frequency of the hardware module using information received from the AI system 701, hardware module information included in the information, and the DVFS governor 703 and the DVFS device driver 705 of the hardware module.

The operating frequency may be dynamically set using the AI system 701 and the AI DVFS manager 704 so as to efficiently perform the application to run on the electronic device in response to the user input. This will be described in greater detail below with reference to FIG. 8.

The scheduler 702 may calculate information about the workload. In an embodiment, the scheduler 702 may monitor the workload occurring in the system and may calculate a value corresponding to the workload.

The DVFS governor 703 may select the operating frequency. The DVFS governor 703 may include at least one policy. For example, the DVFS governor 703 may include at least one mode according to at least one policy. For example, the DVFS governor 703 may include a power save mode according to a policy of keeping an operating frequency to be low, a performance mode according to a policy of keeping an operating frequency to be high, a user space mode according to a policy of allowing an external user to forcibly set an operating frequency as a specific frequency, and a mode according to a policy of setting appropriate dynamic frequency based on a workload.

The DVFS governor 703 may deliver an operating frequency set according to the policy to the DVFS device driver 705.

The DVFS device driver 705 may drive workloads by setting a voltage value depending on the received operating frequency.

Figure 8:
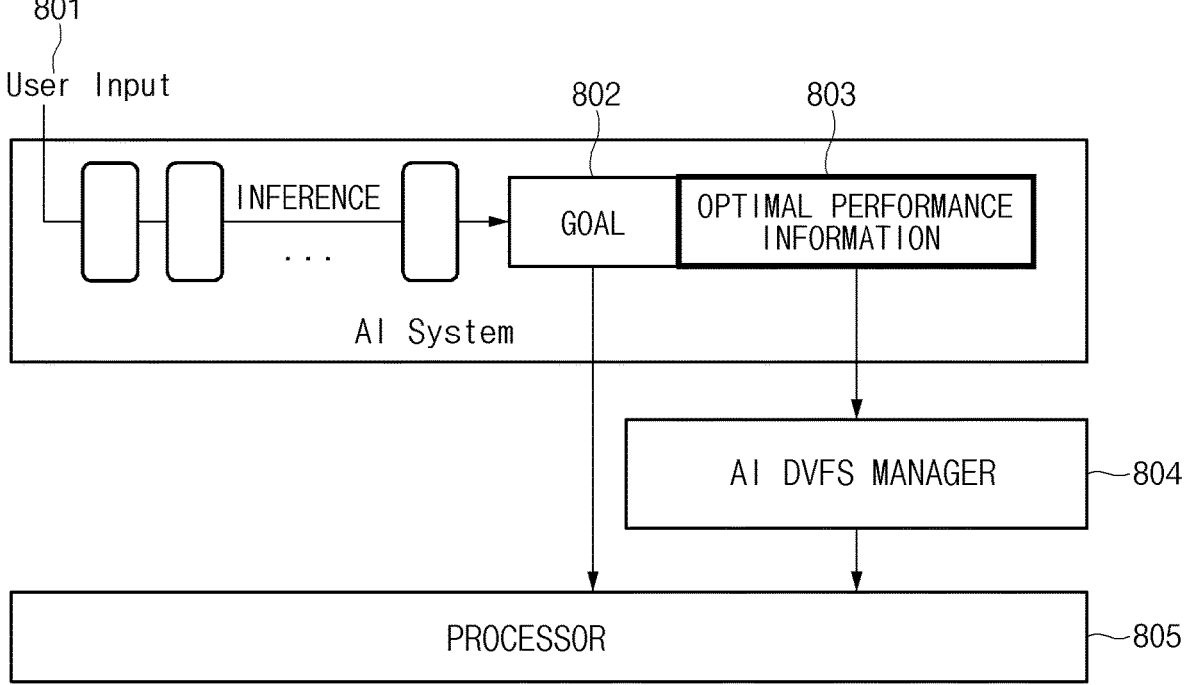
FIG. 8 is a diagram illustrating an example method of operating an AI system using an AI DVFS manager, according to various embodiments.

FIG. 8 is a diagram illustrating an example method of operating an AI system using an AI DVFS manager, according to various embodiments. For clarity of description, descriptions the same as the above-mentioned descriptions may be briefly described or may not be repeated here.

An AI system may refer to a system that defines an application to operate on an electronic device in response to a user input received using an interface, which is included in or operatively connected to the electronic device (e.g., the user terminal 301 in FIG. 3, the electronic device 600 in FIG. 6, or the electronic device 700 in FIG. 7), and operates the trained model. For example, an AI system may be a voice assistant system.

The AI system may receive a user input 801 through a user interface included in or operatively connected to the electronic device. For example, the electronic device may receive an audio stream as the user input 801 using a microphone.

The AI system may infer a goal 802 for the received user input 801. The AI system may infer optimal performance information 803 for performing the goal 802. The optimal performance information 803 may refer, for example, to optimal information for implementing the goal 802. For example, the optimal performance information 803 may include hardware module information H/W Module to be executed to perform the goal 802, operating frequency information, governor policy information Governor, and/or time information indicating that a governor policy needs to be maintained. The governor policy may include a performance mode, in which the electronic device has high performance, and a power save mode in which the electronic device operates at low power. In an embodiment, the AI system may infer the optimal performance information 803 using data stored in the AI system.

The AI system may generate a task for performing the inferred goal 802 and then may allow at least one processor

805 to perform the task. The AI system may deliver the optimal performance information 803 to an AI DVFS manager 804 such that the electronic device operates with optimal performance when at least one processor 805 performs the goal 802.

Hereinafter, a method for setting an operating frequency using an AI DVFS manager will be described in greater detail below with reference to FIGS. 9, 10, 11 and 12.

Figure 9:
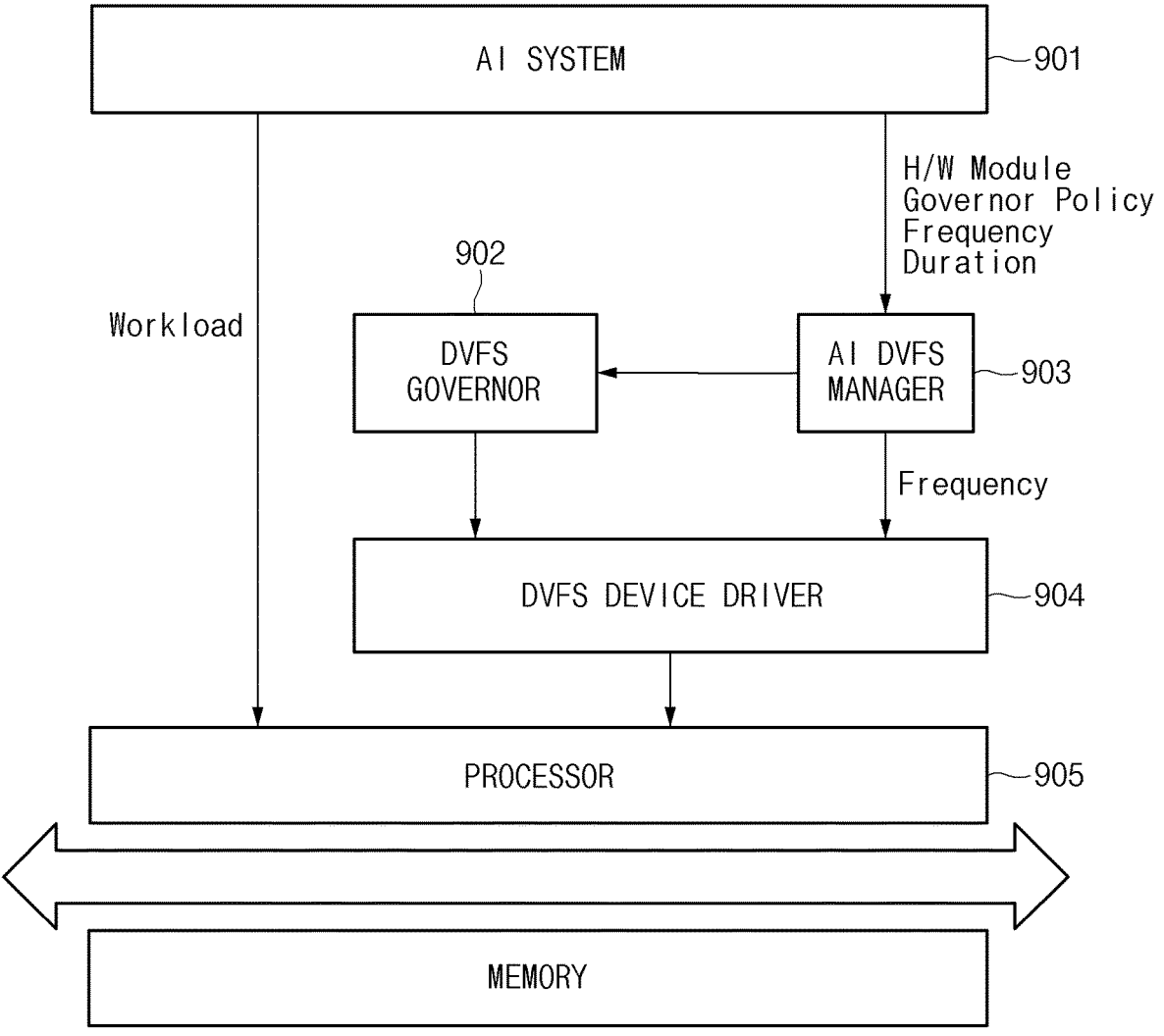
FIG. 9 is a diagram illustrating an example method for setting operating frequency using an AI DVFS manager, according to various embodiments.

FIG. 9 is a diagram illustrating an example method for setting an operating frequency using an AI DVFS manager, according to various embodiments. For clarity of description, descriptions the same as the above-mentioned descriptions may be briefly described or may not be repeated here.

An AI system 901 may refer to a system that defines an application to operate on an electronic device in response to a user input received using an interface, which is included in or operatively connected to the electronic device, and operates the trained model. For example, the AI system 901 may be a voice assistant system.

The AI system 901 may receive a user input 801 through an interface included in or operatively connected to the electronic device. The AI system 901 may infer a goal based on the received user input. The AI system 901 may infer optimal performance information for performing the goal. Referring to FIG. 9, the AI system 901 may infer the optimal performance information including hardware module information H/W Module, operating frequency information Frequency, governor policy information Governor, or/and time information Duration for maintaining the governor policy to perform the goal.

In an embodiment, the AI system 901 may infer the optimal performance information using data stored in the AI system 901. The AI system 901 may deliver the optimal performance information to an AI DVFS manager 903.

The AI DVFS manager 903 may set a DVFS governor 902 using the governor policy information Governor received from the AI system 901 or/and the time information Duration for maintaining the governor policy.

In an embodiment, the AI DVFS manager 903 may set the DVFS governor 902 to a governor policy according to the governor policy information during only a period, in which the governor policy needs to be maintained, depending on the time information Duration for maintaining the governor policy received from the AI system 901. In an embodiment, when the period, in which the governor policy needs to be maintained, has elapsed, the AI DVFS manager 903 may set the DVFS governor 902 to a governor policy, which is prior to the governor policy according to the governor policy information, and then may allow the AI DVFS manager 903 to terminate an operation of the AI DVFS manager 903.

Under control of the AI DVFS manager 903, the operating frequency of the hardware module may be set through optimal performance information received from the AI system 901, and the DVFS governor 902 and a DVFS device driver 904 of the hardware module (H/W module) included in the optimal performance information.

The AI system 901 may generate a task for performing the inferred goal and then may allow at least one processor 905 to perform the generated task. The AI system 901 may deliver the optimal performance information to the AI DVFS manager 903 such that the electronic device operates with optimal performance when the processor 905 performs the task.

Hereinafter, each method of setting an operating frequency by using an AI DVFS manager depending on the type of information included in optimal performance information is described in greater detail below with reference to FIGS. 10, 11 and 12.

Figure 10:
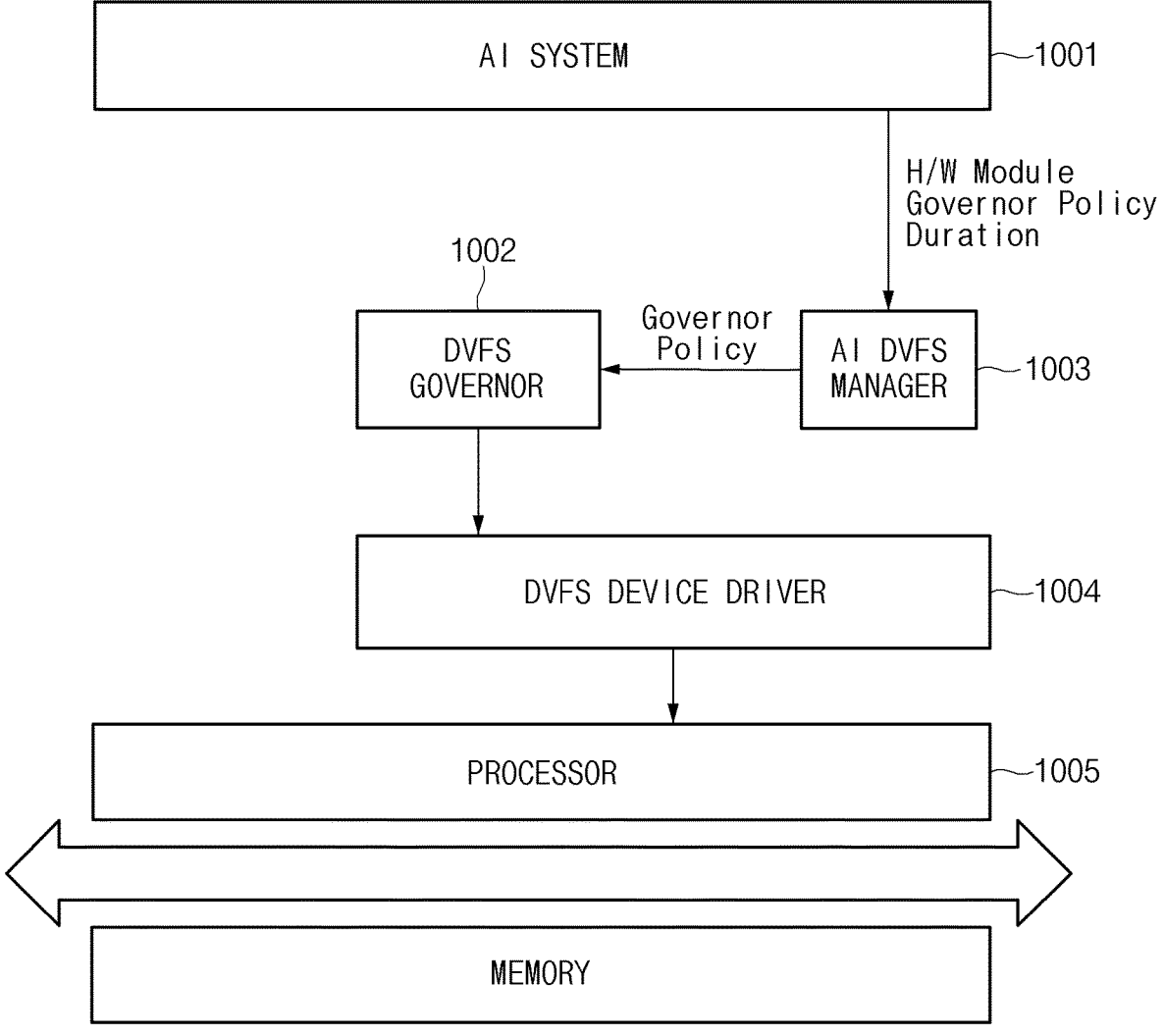
FIG. 10 is a diagram illustrating an example method, in which an AI DVFS manager sets an operating frequency, when optimal performance information includes governor policy information and excludes operating frequency information, according to various embodiments.

FIG. 10 is a diagram illustrating an example method, in which an AI DVFS manager sets an operating frequency, when optimal performance information includes governor policy information and excludes operating frequency information, according to various embodiments. For clarity of description, descriptions the same as the above-mentioned descriptions may be briefly described or may not be repeated here.

An AI system 1001 may refer to a system that defines an application to operate on an electronic device in response to a user input received using an interface, which is included in or operatively connected to the electronic device, and operates the trained model. For example, the AI system 1001 may be a voice assistant system.

The AI system 1001 may receive a user input through an interface included in or operatively connected to the electronic device. The AI system 1001 may infer a goal based on the received user input. The AI system 1001 may infer optimal performance information for performing the goal. Referring to FIG. 10, the AI system 1001 may infer the optimal performance information including hardware module information H/W Module, governor policy information Governor, or/and time information Duration for maintaining the governor policy to perform the goal. In an embodiment, the AI system 1001 may infer the optimal performance information using data stored in the AI system 1001. The AI system 1001 may deliver the optimal performance information to an AI DVFS manager 1003.

The AI DVFS manager 1003 may set a DVFS governor 1002 using the governor policy information Governor received from the AI system 1001 or/and the time information Duration for maintaining the governor policy.

Under control of the AI DVFS manager 1003, an operating frequency may be set depending on the governor policy information Governor Policy received from the AI system 1001.

In an embodiment, the AI DVFS manager 1003 may set the DVFS governor 1002 to a governor policy according to the governor policy information during only a period, in which the governor policy needs to be maintained, depending on the time information Duration for maintaining the governor policy received from the AI system 1001. In an embodiment, when the period, in which the governor policy needs to be maintained, has elapsed, the AI DVFS manager 1003 may set the DVFS governor 1002 to a governor policy, which is prior to the governor policy according to the governor policy information, and then may allow the AI DVFS manager 1003 to terminate an operation of AI DVFS manager 1003.

Under control of the AI DVFS manager 1003, the operating frequency of the hardware module may be set through optimal performance information received from the AI system 1001, and the DVFS governor 1002 and a DVFS device driver 1004 of the hardware module (H/W module) included in the optimal performance information.

The AI system 1001 may generate a task for performing the inferred goal and then may allow at least one processor 1005 to perform the generated task. The AI system 1001 may deliver the optimal performance information to the AI DVFS manager 1003 such that the electronic device operates with optimal performance when at least one processor 1005 performs the task.

Figure 11:
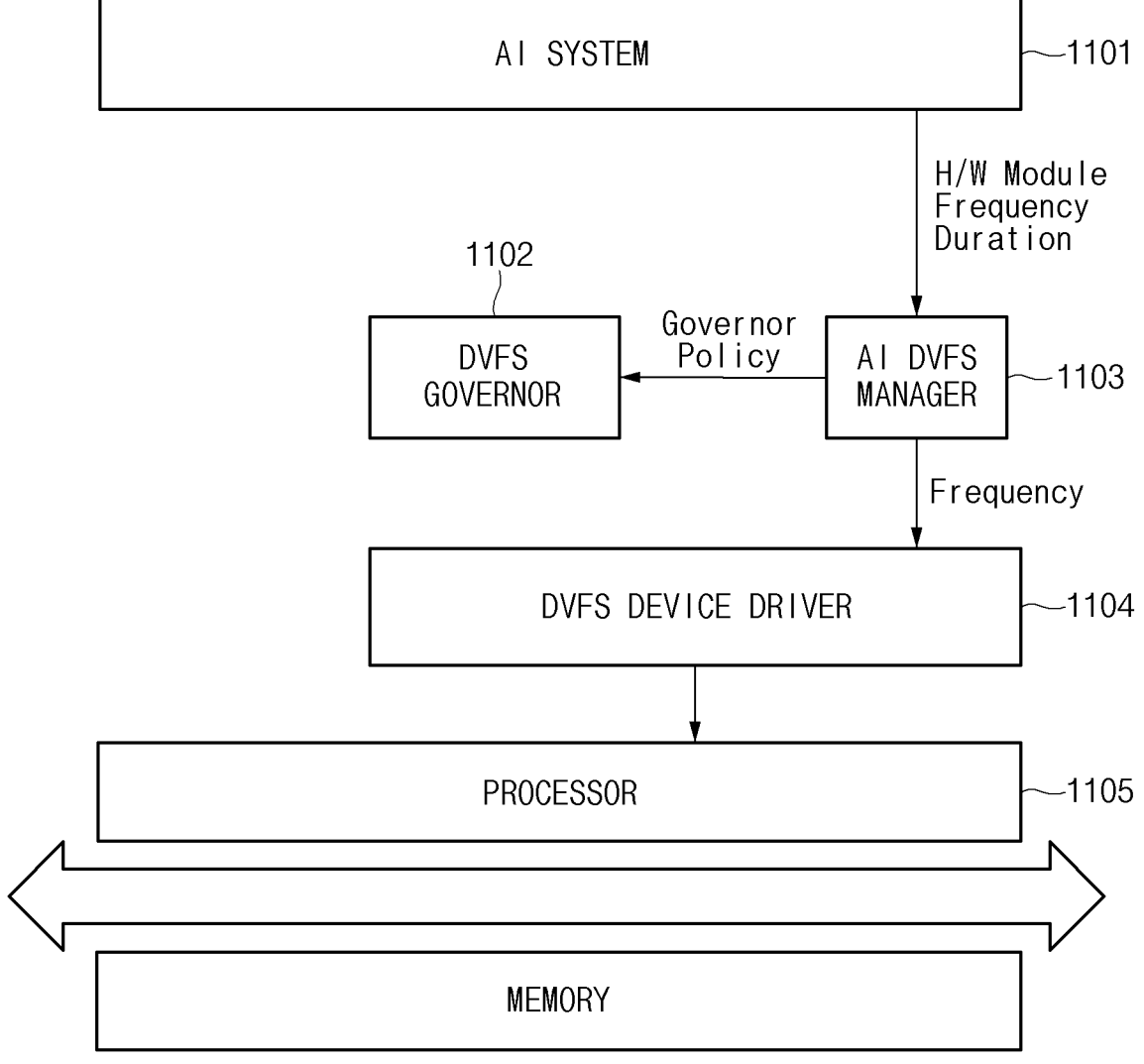
FIG. 11 is a diagram illustrating an example method, in which an AI DVFS manager sets an operating frequency, when optimal performance information includes operating frequency information and excludes governor policy information, according to various embodiments.

FIG. 11 is a diagram illustrating an example method, in which an AI DVFS manager sets an operating frequency, when optimal performance information includes operating frequency information and excludes governor policy information, according to various embodiments. For clarity of description, descriptions the same as the above-mentioned descriptions may be briefly described or may not be repeated here.

An AI system 1101 may refer to a system that defines an application to operate on the electronic device in response to a user input received using an interface, which is included in or operatively connected to the electronic device, and operates the trained model. For example, the AI system 1101 may be a voice assistant system.

The AI system 1101 may receive a user input through an interface included in or operatively connected to the electronic device. The AI system 1101 may infer a goal based on the received user input. The AI system 1101 may infer optimal performance information for performing the goal.

Referring to FIG. 11, the AI system 1101 may infer the optimal performance information including hardware module information H/W Module, operating frequency information Frequency, or/and time information Duration for maintaining the governor policy to perform the goal. In an embodiment, the AI system 1101 may infer the optimal performance information using data stored in the AI system 1101. The AI system 1101 may transmit the optimal performance information to an AI DVFS manager 1103.

The AI DVFS manager 1103 may set a DVFS governor 1102 using the operating frequency information Frequency received from the AI system 1101 or/and the time information Duration for maintaining the governor policy.

The AI DVFS manager 1103 may determine whether hardware module H/W Module included in the hardware module information H/W Module is capable of operating at an operating frequency according to the operating frequency information Frequency. For example, the AI DVFS manager 1103 may determine whether an operating frequency according to the operating frequency information frequency is within an operating frequency range supported by an electronic device that will operate the hardware module H/W Module included in the hardware module information H/W Module. The AI DVFS manager 1103 may determine whether the hardware module H/W Module included in the hardware module information H/W Module is capable of operating at an operating frequency according to the operating frequency information Frequency, thereby preventing and/or reducing issues occurring because operating frequency ranges supported by electronic devices are different from one another.

In an embodiment, when the hardware module H/W Module included in the hardware module information H/W Module is capable of being driven at an operating frequency according to the operating frequency information Frequency, the AI DVFS manager 1103 may change the governor policy such that the AI DVFS manager 1103 sets the operating frequency by setting the DVFS governor 1102.

In an embodiment, when the governor policy is changed, the AI DVFS manager 1103 may set the operating frequency to a value that is equal to or higher than an operating frequency according to the operating frequency information included in the optimal performance information.

In an embodiment, when the hardware module H/W Module included in the hardware module information H/W Module is incapable of being operated at the operating frequency according to the operating frequency information Frequency, the operating frequency may be set according to Table 1 below.

TABLE 1

| Case | Setting value |
|---|---|
| Request Frequency > H/W Module Max Frequency | H/W Module Max Frequency |
| Request Frequency < H/W Module Min Frequency | H/W Module Min Frequency |

In an embodiment, the AI DVFS manager 1103 may set the DVFS governor 1102 to the set governor policy during only a period, in which the governor policy needs to be maintained, depending on the time information Duration for maintaining the governor policy received from the AI system 1101.

In an embodiment, when the period, in which the governor policy needs to be maintained, has elapsed, the AI DVFS manager 1103 may set the DVFS governor 1102 to a governor policy, which is prior to the set governor policy, and then may allow the AI DVFS manager 1103 to terminate an operation of AI DVFS manager 1103.

The AI system 1101 may generate a task for performing the inferred goal and then may allow at least one processor 1105 to perform the generated task. The AI system 1101 may deliver the optimal performance information to the AI DVFS manager 1103 such that the electronic device operates with optimal performance when at least one processor 1105 performs the task.

Figure 12:
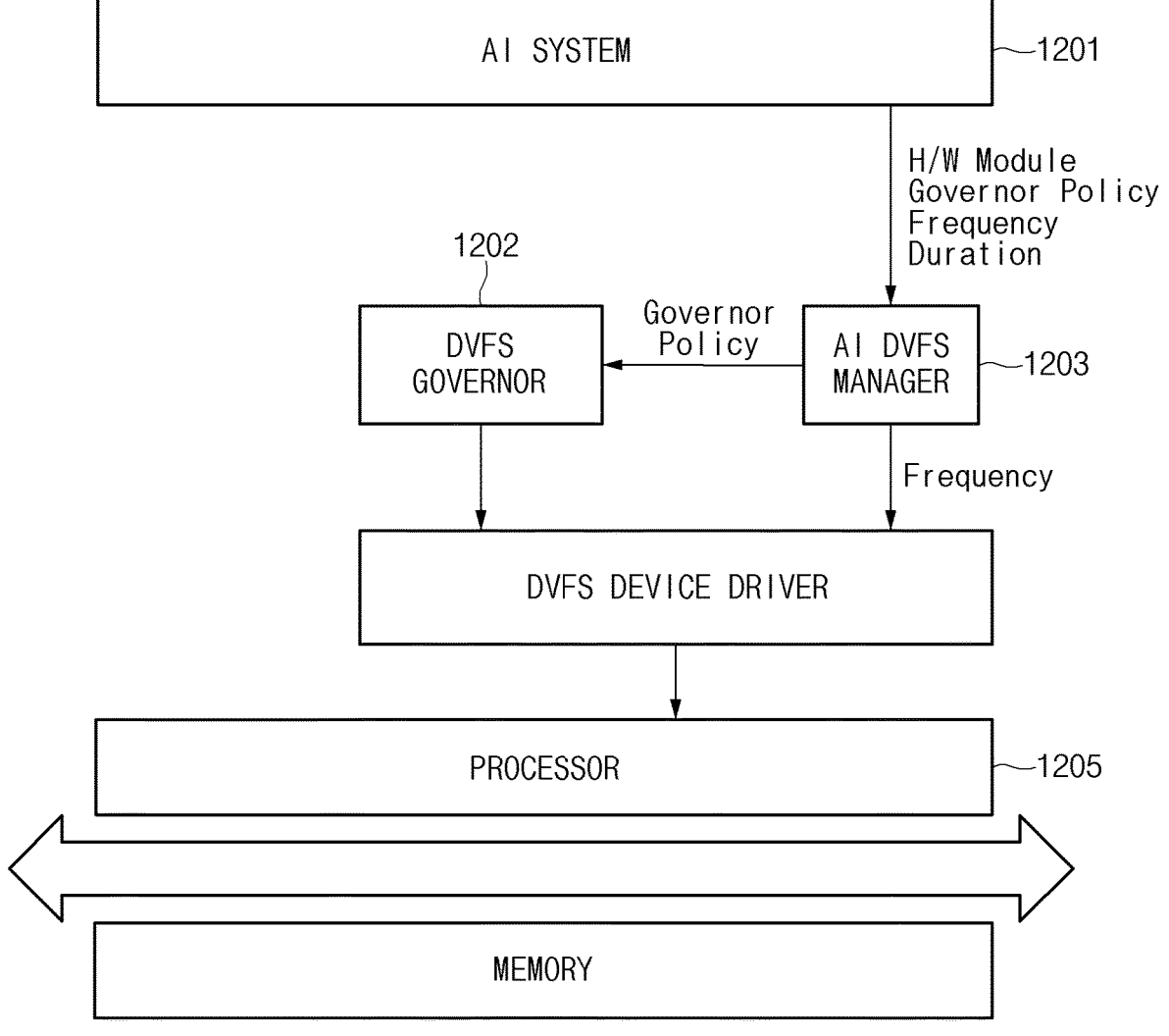
FIG. 12 is a diagram illustrating an example method, in which an AI DVFS manager sets an operating frequency, when optimal performance information includes both operating frequency information and governor policy information, according to various embodiments.

FIG. 12 is a diagram illustrating an example method, in which an AI DVFS manager sets an operating frequency, when optimal performance information includes both operating frequency information and governor policy information, according to various embodiments. For clarity of description, descriptions the same as the above-mentioned descriptions may be briefly described or may not be repeated here.

An AI system 1201 may refer to a system that defines an application to operate on the electronic device in response to a user input received using an interface, which is included in or operatively connected to the electronic device, and operates the trained model. For example, the AI system 1201 may be a voice assistant system.

The AI system 1201 may receive a user input through an interface included in or operatively connected to the electronic device. The AI system 1201 may infer a goal based on the received user input. The AI system 1201 may infer optimal performance information for performing the goal. Referring to FIG. 12, the AI system 1201 may infer the optimal performance information including hardware module information H/W Module, operating frequency information Frequency, governor policy information Governor, and/or time information Duration for maintaining the governor policy to perform the goal.

In an embodiment, the AI system 1201 may infer the optimal performance information using data stored in the AI system 1201. The AI system 1201 may transmit the optimal performance information to an AI DVFS manager 1203.

The AI DVFS manager 1203 may set a DVFS governor 1202 using the operating frequency information Frequency received from the AI system 1201 or/and the time information Duration for maintaining the governor policy.

The AI DVFS manager 1203 may determine whether hardware module H/W Module included in the hardware module information H/W Module is capable of operating at an operating frequency according to the operating frequency information Frequency. For example, the AI DVFS manager 1203 may determine whether an operating frequency according to the operating frequency information frequency is within an operating frequency range supported by an electronic device that will operate the hardware module H/W Module included in the hardware module information H/W Module. The AI DVFS manager 1203 may determine whether the hardware module H/W Module included in the hardware module information H/W Module is capable of operating at an operating frequency according to the operating frequency information Frequency, thereby preventing and/or reducing issues occurring because operating frequency ranges supported by electronic devices are different from one another.

In an embodiment, when the hardware module H/W Module included in the hardware module information H/W Module is capable of being driven at an operating frequency according to the operating frequency information Frequency, the AI DVFS manager 1203 may change the governor policy such that the AI DVFS manager 1203 sets the operating frequency by setting the DVFS governor 1202.

In an embodiment, when the governor policy is changed, the AI DVFS manager 1203 may set the operating frequency to a value that is equal to or higher than an operating frequency according to the operating frequency information included in the optimal performance information.

In an embodiment, when the hardware module H/W Module included in the hardware module information H/W Module is incapable of being operated at the operating frequency according to the operating frequency information Frequency, the governor policy information Governor Policy received from the AI system 1201 may be delivered to the DVFS governor 1202 to set the operating frequency according to the governor policy.

In an embodiment, the AI DVFS manager 1203 may set the DVFS governor 1202 to the set governor policy during only a period, in which the governor policy needs to be maintained, depending on the time information Duration for maintaining the governor policy received from the AI system 1201.

In an embodiment, when the period, in which the governor policy needs to be maintained, has elapsed, the AI DVFS manager 1203 may set the DVFS governor 1202 to a governor policy, which is prior to the set governor policy, and then may allow the AI DVFS manager 1203 to terminate an operation of AI DVFS manager 1203.

The AI system 1201 may generate a task for performing the inferred goal and then may allow at least one processor 1205 to perform the generated task. The AI system 1201 may deliver the optimal performance information to the AI DVFS manager 1203 such that the electronic device operates with optimal performance when at least one processor 1205 performs the task.

Hereinafter, according to an embodiment, a method in which an electronic device sets an operating frequency will be described in greater detail below with reference to FIG. 13.

Figure 13:
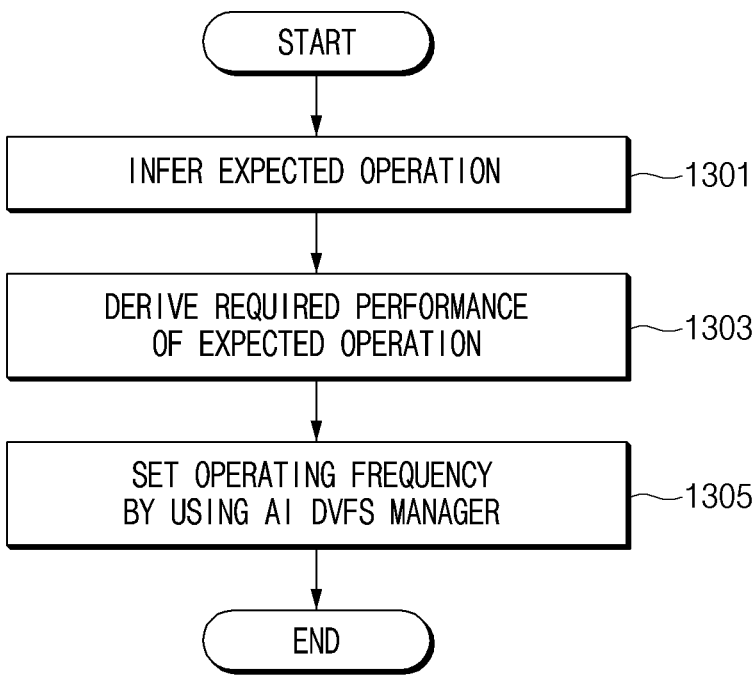
FIG. 13 is a flowchart illustrating an example method, in which an electronic device sets an operating frequency, according to various embodiments.

FIG. 13 is a flowchart 1300 illustrating an example method, in which an electronic device sets an operating frequency, according to various embodiments. According to an embodiment, it may be understood that the process illustrated in FIG. 13 is performed by at least one processor (e.g., at least one processor 120 of FIG. 1) of an electronic device (e.g., the electronic device 101 of FIG. 1) by executing instructions stored in a memory (e.g., the memory 130 of FIG. 1).

In operation 1301, the electronic device may infer an expected operation. The expected operation may refer, for example, to a goal to be performed by the electronic device in response to a user input received through an interface included in or operatively connected to the electronic device.

For example, the electronic device may receive audio streams as the user input using a microphone, and then may infer the expected operation by analyzing the audio streams.

In an embodiment, the electronic device may infer the expected operation using an AI system. The AI system may refer to a system that defines an application to operate on an electronic device in response to a user input received using an interface, which is included in or operatively connected to the electronic device (e.g., the user terminal 301 in FIG. 3, the electronic device 600 in FIG. 6, or the electronic device 700 in FIG. 7), and operates the trained model. For example, the AI system may be a voice assistant system.

In operation 1303, the electronic device may derive the required performance of the expected operation. In an embodiment, the electronic device may derive the required performance of the expected operation using the AI system. The required performance of the expected operation may refer, for example, to optimal performance information for performing the goal inferred by the expected operation. For example, the optimal performance information may include hardware module information H/W Module to be executed to perform the goal, operating frequency information, governor policy information Governor, and/or time information indicating that a governor policy needs to be maintained. The governor policy may include a performance mode, in which the electronic device has high performance, and a power save mode in which the electronic device operates at low power. In an embodiment, the electronic device may infer the optimal performance information using data stored in the AI system.

In operation 1305, the electronic device may set an operating frequency using an AI DVFS manager. In an embodiment, the electronic device may set the operating frequency of the AI DVFS manager using information included in the optimal performance information. Through the AI DVFS manager, the electronic device may set the DVFS governor using the governor policy information included in the optimal performance information Governor Policy or/and the time information Duration for maintaining a governor policy. This is described in detail with reference to FIGS. 9 to 14, and thus is omitted to avoid redundancy.

According to an example embodiment, a method performed by the electronic device may include: inferring an expected operation corresponding to a user input received using a user interface included in or operatively connected to the electronic device, deriving required performance information about the expected operation, and setting an operating frequency using an AI DVFS manager based on the required performance information thus derived.

According to an example embodiment, the method performed by the electronic device may further include receiving a voice signal included in the user input using an audio module included in or operatively connected to the electronic device, and training, by the audio module, using a learning algorithm.

According to an example embodiment, the method performed by the electronic device may further include inferring the expected operation using an AI system that defines an application to operate on the electronic device and operates a trained model, in response to the user input.

According to an example embodiment, the method performed by the electronic device may further include deriving the required performance information including at least one of hardware module information for performing the expected operation, operating frequency information, governor policy information, and time information indicating that a governor policy according to the governor policy information needs to be maintained.

According to an example embodiment, the method performed by the electronic device may further include setting a DVFS governor to the governor policy according to the governor policy information using the AI DVFS manager depending on the time information indicating that the governor policy included in the required performance information needs to be maintained, during a time required to maintain the governor policy included in the required performance information, and setting a DVFS governor to a governor policy, which is prior to the governor policy according to the governor policy information based on the time required to maintain the governor policy elapsing.

According to an example embodiment, the method performed by the electronic device may further include setting the operating frequency according to the governor policy information using an AI DVFS manager based on the required performance information including governor policy information and excluding operating frequency information.

According to an example embodiment, the method performed by the electronic device may further include determining whether hardware module included in the hardware module information is capable of operating at a first operating frequency according to the operating frequency information, using the AI DVFS manager based on the required performance information including operating frequency information and hardware module information and excluding governor policy information, changing a governor policy such that the AI DVFS manager sets the operating frequency when the hardware module is capable of operating at the first operating frequency, and setting the operating frequency to a value, equal to or higher than the first operating frequency, according to the changed governor policy.

According to an example embodiment, the method performed by the electronic device may further include setting the operating frequency to a maximum operating frequency of the hardware module or a minimum operating frequency of the hardware module based on the hardware module being incapable of operating at the first operating frequency.

According to an example embodiment, the method performed by the electronic device may further include: determining whether a hardware module included in the hardware module information is capable of operating at a second operating frequency according to the operating frequency information, using the AI DVFS manager based on the required performance information including hardware module information, governor policy information, and operating frequency information, changing a governor policy such that the AI DVFS manager sets the operating frequency when the hardware module is capable of operating at the second operating frequency, and setting the operating frequency to a value, equal to or higher than the second operating frequency, according to the changed governor policy.

According to an example embodiment, the method performed by the electronic device may further include setting the operating frequency according to governor policy information included in the required performance information based on hardware module included in the required performance information being incapable of operating at an operating frequency included in the required performance information.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, a home appliance, or the like. An electronic device according to an embodiment of this disclosure may not be limited to the above-described electronic devices.

Various embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", a component is connectable to the other component, directly (e.g., by wire), wirelessly, or through the third component.

In various embodiments of the disclosure, the term "module" used herein may include a unit, which is implemented with hardware, software, or firmware, or any combination thereof, and may be interchangeably used with the terms "logic", "logical block", "part", or "circuit". The "module" may be a minimum unit of an integrated part or may be a minimum unit of the part for performing one or more functions or a part thereof. For example, according to an embodiment, the module may be implemented in the form of an application-specific integrated circuit (ASIC).

Various embodiments of the disclosure may be implemented with software (e.g., the program 140) including one or more instructions stored in a storage medium (e.g., the embedded memory 136 or the external memory 138) readable by a machine (e.g., the electronic device 101). For example, the processor (e.g., the processor 120) of the machine (e.g., the electronic device 101) may call at least one instruction of the stored one or more instructions from a storage medium and then may execute the at least one instruction. This enables the machine to operate to perform at least one function depending on the called at least one instruction. The one or more instructions may include a code generated by a compiler or a code executable by an interpreter. The machine-readable storage medium may be provided in the form of a non-transitory storage medium. Herein, the 'non-transitory' storage medium is a tangible device and may not include a signal (e.g., electromagnetic waves), and this term does not distinguish between the case where data is semipermanently stored in the storage medium and the case where the data is stored temporarily.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to various embodiments, each component (e.g., a module or a program) of the above-described components may include a single entity or a plurality of entities, and some of the plurality of objects may be separately arranged on other components. According to various embodiments, one or more components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments, operations executed by modules, programs, or other components may be executed by a successive method, a parallel method, a repeated method, or a heuristic method. Alternatively, at least one or more of the operations may be executed in another order or may be omitted, or one or more operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a user interface comprising circuitry;
at least one processor comprising processing circuitry operatively connected to the user interface; and
a memory operatively connected to at least one processor, wherein the at least one processor is configured to:
infer an expected operation corresponding to an input received using the user interface;
derive required performance information about the expected operation, the derived required performance information including hardware module information for performing the expected operation and at least one of operating frequency information of a hardware module, governor policy information indicating a performance mode of the hardware module, and time information indicating that a governor policy according to the governor policy information needs to be maintained; and
set an operating frequency using an artificial intelligence (AI) dynamic voltage frequency scaling (DVFS) manager based on the required performance information.

2. The electronic device of claim 1, further comprising:
an audio module comprising audio circuitry operatively connected to or included in at least one processor,
wherein at least one processor is configured to:
cause the audio module to receive a voice signal included in the input, and wherein the audio module is configured to be trained using a learning algorithm.

3. The electronic device of claim 1, wherein at least one processor is configured to:
infer the expected operation using an AI system defining an application to operate on the electronic device and operating a trained model, in response to the input.

4. The electronic device of claim 1, wherein
the required performance information includes the operating frequency information, the governor policy information, and the time information.

5. The electronic device of claim 1, wherein at least one processor is configured to:
set a DVFS governor to the governor policy according to the governor policy information using the AI DVFS manager depending on the time information indicating that the governor policy included in the required performance information needs to be maintained, during a time required to maintain the governor policy included in the required performance information; and
set the DVFS governor to a governor policy, prior to the governor policy according to the governor policy information, in response to the time required to maintain the governor policy elapsing.

6. The electronic device of claim 1, wherein at least one processor is configured to:
based on the required performance information including the governor policy information and excluding the operating frequency information, set the operating frequency according to the governor policy information using the AI DVFS manager.

7. The electronic device of claim 1, wherein at least one processor is configured to:
based on the required performance information including the operating frequency information and excluding the governor policy information, determine whether hardware module included in the hardware module information is capable of operating at a first operating frequency according to the operating frequency information, using the AI DVFS manager;
based on the hardware module being capable of operating at the first operating frequency, change a governor policy such that the AI DVFS manager sets the operating frequency; and
set the operating frequency to a value, equal to or higher than the first operating frequency, according to the changed governor policy.

8. The electronic device of claim 1, wherein at least one processor is configured to:
based on the required performance information including the governor policy information, and the operating frequency information, determine whether the hardware module included in the hardware module information is capable of operating at a second operating frequency according to the operating frequency information, by using the AI DVFS manager;
based on the hardware module being capable of operating at the second operating frequency, change a governor policy such that the AI DVFS manager sets the operating frequency; and
set the operating frequency to a value, equal to or higher than the second operating frequency, according to the changed governor policy.

9. The electronic device of claim 1, wherein at least one processor is configured to:
based on the hardware module included in the required performance information being incapable of operating at an operating frequency included in the required performance information, set the operating frequency according to governor policy information included in the required performance information.

10. The electronic device of claim 7, wherein at least one processor is configured to:

based on the hardware module being incapable of operating at the first operating frequency, set the operating frequency to a maximum operating frequency of the hardware module or a minimum operating frequency of the hardware module.

11. A method performed by an electronic device comprising at least one processor comprising processing circuitry, the method comprising:

receiving, using an user interface included in or operatively connected to the electronic device, an input;

inferring an expected operation corresponding to the input received using the user interface;

deriving required performance information about the expected operation, the derived required performance information including hardware module information for performing the expected operation and at least one of operating frequency information of a hardware module, governor policy information indicating a performance mode of the hardware module, and time information indicating that a governor policy according to the governor policy information needs to be maintained; and setting an operating frequency using an artificial intelligence dynamic voltage frequency scaling (AI DVFS) manager based on the required performance information.

12. The method of claim 11, further comprising:

receiving a voice signal included in the input using an audio module included in or operatively connected to the electronic device; and training, by the audio module, using a learning algorithm.

13. The method of claim 11, further comprising:

inferring the expected operation using an AI system defining an application to operate on the electronic device and operating a trained model, in response to the input.

14. The method of claim 11, wherein the required performance information includes the operating frequency information, the governor policy information, and the time information.

15. The method of claim 11, further comprising:

setting a DVFS governor to the governor policy according to the governor policy information using the AI DVFS manager depending on the time information indicating that the governor policy included in the required performance information needs to be maintained, during a time required to maintain the governor policy included in the required performance information; and based on the time required to maintain the governor policy elapsing, setting the DVFS governor to a governor policy, prior to the governor policy according to the governor policy information.

16. The method of claim 11, further comprising:

based on the required performance information including the governor policy information and excluding the operating frequency information, setting the operating frequency according to the governor policy information using the AI DVFS manager.

17. The method of claim 11, further comprising:

based on the required performance information including the operating frequency information and excluding the governor policy information, determining whether a hardware module included in the hardware module information is capable of operating at a first operating frequency according to the operating frequency information, using the AI DVFS manager;

based on the hardware module being capable of operating at the first operating frequency, changing a governor policy such that the AI DVFS manager sets the operating frequency; and setting the operating frequency to a value, equal to or higher than the first operating frequency, according to the changed governor policy.

18. The method of claim 11, further comprising:

based on the required performance information including the governor policy information, and the operating frequency information, determining whether the hardware module included in the hardware module information is capable of operating at a second operating frequency according to the operating frequency information, using the AI DVFS manager;

based on the hardware module being capable of operating at the second operating frequency, changing a governor policy such that the AI DVFS manager sets the operating frequency; and setting the operating frequency to a value, equal to or higher than the second operating frequency, according to the changed governor policy.

19. The method of claim 11, further comprising:

based on the hardware module included in the required performance information being incapable of operating at an operating frequency included in the required performance information, setting the operating frequency according to governor policy information included in the required performance information.

20. The method of claim 17, further comprising:

based on the hardware module being incapable of operating at the first operating frequency, setting the operating frequency to a maximum operating frequency of the hardware module or a minimum operating frequency of the hardware module.

* * * * *